(12) United States Patent
Drumheller

(10) Patent No.: US 7,444,269 B2
(45) Date of Patent: Oct. 28, 2008

(54) CONSTRAINT-BASED METHOD OF DESIGNING A ROUTE FOR A TRANSPORT ELEMENT

(75) Inventor: Michael Drumheller, Seattle, WA (US)

(73) Assignee: The Boeing Company, Seattle, WA (US)

( * ) Notice: Subject to any disclaimer, the term of this patent is extended or adjusted under 35 U.S.C. 154(b) by 379 days.

(21) Appl. No.: 09/967,784

(22) Filed: Sep. 29, 2001

(65) Prior Publication Data

US 2003/0101029 A1    May 29, 2003

(51) Int. Cl.
G06F 17/50    (2006.01)
G06G 7/48     (2006.01)
H01R 43/00    (2006.01)

(52) U.S. Cl. ............ 703/1; 29/857; 703/6; 703/7; 703/8; 703/9

(58) Field of Classification Search .......... 703/1, 703/6, 7, 9; 700/98, 103; 716/8, 12; 29/857
See application file for complete search history.

(56) References Cited

U.S. PATENT DOCUMENTS

| | | | | |
|---|---|---|---|---|
| 4,615,011 A | * | 9/1986 | Linsker | 716/13 |
| 5,227,983 A | * | 7/1993 | Cox et al. | 703/1 |
| 5,329,464 A | * | 7/1994 | Sumic et al. | 703/1 |
| 5,452,238 A | * | 9/1995 | Kramer et al. | 703/1 |
| 5,517,428 A | * | 5/1996 | Williams | 703/1 |
| 5,740,341 A | * | 4/1998 | Oota et al. | 345/420 |
| 5,761,674 A | * | 6/1998 | Ito | 707/104.1 |
| 6,198,906 B1 | * | 3/2001 | Boetje et al. | 455/3.01 |
| 6,543,043 B1 | * | 4/2003 | Wang et al. | 716/14 |
| 6,745,097 B2 | * | 6/2004 | Kusuzono et al. | 700/142 |

FOREIGN PATENT DOCUMENTS

EP    0 696 775 A1    2/1996
EP    1 130 527 A2    9/2001

OTHER PUBLICATIONS

Hsu et al, "A constraint-based manipulator toolset for editing 3D objects" Proceedings of the Fourth ACM Symposium on Solid Modeling and Applications, May 1997.*

Fernando et al, "Software Architecture for a Constraint-based Virtual Environment", Proceedings of the ACM symposium on Virtual reality software and technology, Dec. 1999.*

(Continued)

*Primary Examiner*—Albert DeCady
*Assistant Examiner*—Thomas H Stevens
(74) *Attorney, Agent, or Firm*—Alston & Bird LLP

(57) ABSTRACT

An improved method for designing the route of a transport element, such as a tube, is provided. The method preferably designs the route automatically and, by utilizing path constraints in the design of the route, as opposed to during a post design check, ensures that the resulting route complies with the various path constraints. In addition, the method of the present invention may establish a selection criterion to evaluate a plurality of feasible routes of the transport element that each comply with the path constraints such that a preferred or optimal route may be designed.

50 Claims, 16 Drawing Sheets

OTHER PUBLICATIONS

Hu et al, "A timing-constrained algorithm for simultaneous global routing of multiple nets", Computer Aided Design, 2000. ICCAD-2000. IEEE/ACM International Conference on, Nov. 5-9, 2000 pp. 99-103.*

Zhu et al., "Pipe Routing-Path Planning (with many Constraints)" 1991 p. 1940-1947.*

Satyanarayana et al., "An Automated Pipe-Route Planner in Three Dimensional Plant Layout Design" 1992 IEEE p. 71-76.*

Jean-Paul Laumond, Paul E. Jacobs, Michel Taïx and Richard M. Murray, A Motion Planner For Nonholonomic Mobile Robots, *IEEE Transactions On Robotics And Automation*, Oct. 1994, pp. 577-593, vol. 10, No. 5.

Betts, John T. and Huffman, William P. *Mesh Refinement in Direct Transcription Methods for Optimal Control, Optimal Control Applications& Methods*, CCC 0143-2087/98/010001-21, 1998, pp. 1-21,© 1998 John Wiley & Sons, Ltd.

Conru, Andrew B., A Genetic Approach to the Cable Harness Routing Problem, *IEEE*,© 1994, pp. 200-205, 0-7803-1988-4/94.

Kobayashi, Yasuhiro; Mitsuta, Tooru; and Wada, Yutaka, A Knowledge Compilation Method Through Conversation of Symbolic Rules and Facts into Functions, *Journal of Information Processing*, 1988, pp. 183-190, vol. 11, No. 3.

Mitsuta, Toru; Kobayashi, Yasuhiro; Wada, Yutaka and Kiguchi, Takashi, *A Knowledge-Based Approach to Routing Problems in Industrial Plant Design*, 1981, 24 pages.

Park, Hisup; Cutkosky, Mark R.; Conru, Andrew B. and Lee, Soo-Hong, An agent-based approach to concurrent cable harness design, *Artificial Intelligence for Engineering Design, Analysis, and Manufacturing* (1994), pp. 45-61, vol. 8, No. 1, U.S.A.

Zhu, David and Latombe, Jean-Claude, Mechanization of Spatial Reasoning for Automatic Pipe Layout Design, *AI Edam*, 1991, pp. 1-20, 5(1), 0890-0604/91/010001 © 1991 Academic Press Limited.

Jain, D.; Chatterjee, M.; Unemori, A.; and Thangam, N., A Knowledge Based Automatic Pipe Routing System, Computers in Engineering, *ASME* 1992, pp. 127-132, vol. 1.

Satyanarayana, M.V.V., et al., An Automated Pipe-Route Planner in Three Dimensional Plant Layout Design, *IEEE*, 1992, pp. 71-76, 0-8186-2760-3/92.

Gunn, D.J. and Al-Asadi, H.D., Computer-Aided Layout of Chemical Plant: A Computational Method and Case Study, *Computer-Aided Design*, Apr. 3, 1987, 11 pages, vol. 19, No. 3.

*Embassy Revolutionizes Wire Harness Design*, 1997, 1 page, Mechtronix Design Automation, Inc., Westborough, Massachusetts.

Zhu, David and Latombe, Jean-Claude, Pipe Routing—Path Planning (with Many Constraints), Apr. 1991, pp. 1940-1947, *Proceedings of the 1991 IEEE International Conference on Robotics and Automation*, Sacramento, California.

Wangdahl, Glenn E.; Pollack, Stephen M.; and Woodward, John B., *Minimum-Trajectory Pipe Routing, Journal of Ship Research*, Mar. 1974, pp. 46-49, vol. 18, No. 1.

Zhu, David and Latombe, Jean-Claude, *New Heuristic Algorithms for Efficient Hierarchical Path Planning*, Department of Computer Science, Stanford University, Aug. 1989, Report No. STAN-CS-89-1279, Stanford, California.

Bohle, Detlef; Jakobs, Gerhard; Hanisch, Klaus; Kabitz, Harry, Rechnerunterstutzung bei der Rohrleitungs-Konstruktion im 3D-Raum, *Chem.-Ing.-Tech.*, 1982, pp. 241-246,, vol. 54, Nr. 3,S., © Verlag Chemie GmbH, D-6940 Weinheim.

Betts, John T. and Cramer, Evin J., Application of Direct transcription to Commercial Aircraft Trajectory Optimization, *Journal of Guidance, Control, and Dynamics*, Jan.-Feb. 1995, pp. 151-158, vol. 18, No. 9, A Publication of the American Institute of Aeronautics and Astronautics, Inc., Washington, DC.

Betts, J.T., Survey of Numerical Methods for Trajectory Optimization, *Journal of Guidance, Control, and Dynamics*, Mar.-Apr. 1998, pp. 193-207, vol. 21, No. 2, A Publication of the American Institute of Aeronautics and Astronautics, Inc., Washington, DC.

Friedman, Jerome H., *Multivariate Adaptive Regression Splines*, Stanford Linear Accelerator Center and Department of Statistics Stanford University Technical Report, Aug. 1990, 157 pages, SLAC PUB-4960 Rev. Tech Report 102 Rev, Stanford, California.

Kavraki, Lydia; Svestka, Petr; Latombe, Jean-Claude, Overmars, Mark H., Probabilistic Roadmaps For Path Planning in High-Dimensional Configuration Spaces, *IEEE Transactions On Robotics and Automation*, Aug. 4, 1996, pp. 566-580, vol. 12, Issue 4.

Hsu, D.; Latombe, J.-C.; Motwani, R., *Path Planning In Expansive Configuration Spaces*, 1997 IEEE International Conference On Proceedings, 1997, pp. 2719-2726, vol. 3.

Wei, Yu-Feng; Thornton, Anna C., *Robust Design For Tube Bending And Assembly*, http://web.mit.edu/yfwei/www/explorat.htm web page, at least by Jun. 30, 2001.

Gill, Philip E.; Murray, Walter; Saunders, Michael A.; Wright, Margaret H., *User's Guide for NPSOL 5.0: A Fortran Package For Nonlinear Programming*, Technical Report SOL 86-1, Jul. 30, 1998.

Wei, Yu-Feng; Thronton, AC.C, *Tube Production And Assembly Systems: The Impact Of Compliance And Variability On Yield*, Proceedings of ASME Design Automation Conference, DETC2000/DAC-14271, Sep. 2000.

Wei, Yu-Feng; *Concurrent Design For Optimal Quality And Cycle Time*, Thesis, Massachusetts Institute of Technology, Feb. 2001.

Betts, John T., Issues In The Direct Transcription Of Optimal Control Problems To Sparse Nonlinear Programs, in Computational Optimal Control, *International Series of Numerical Mathematics*, 1994, pp. 3-18, vol. 115.

Quinlan, Sean and Oussama Khatib, Elastic Bands: Connecting Path Planning and Control, Article, Proc. IEE Internat'l Conf. On Robotics and Automation, 1993, 6 pages.

Szykman, S and Cagan, J, Synthesis of Optimal Nonorthogonal Routes, *Journal of Mechanical Design*, Sep. 1996, p. 419-424, vol. 118.

Conru, Andrew B. and Cutkosky, Mark R., Computational Support For Interactive Cable Harness Routing And Design, *ASME 1993*, pp. 551-558, DE-vol. 65-1 (Advances in Design Automation—vol. 1), The American Society of Mechanical Engineers, New York, New York, U.S.A.

Yin, Su; Hodges, Peter; Cagan, Jonathan; and Li, Xianren, *Layout of an Automobile Transmission Using Three-Dimensional Shapeable Components*, Sep. 12-15, 1999, pp. 1-9, Proceedings of DETC 99, 1999 ASME Design Engineering Technical Conference, Las Vegas, Nevada, U.S.A.

Hargraves; C.R. and Paris, S.W.; Direct Trajectory Optimization using Nonlinear Programming and Collocation, *J. Guidance*, 1996, pp. 338-342, vol. 10, No. 4, U.S.A.

Betts, John T. and Huffman, William P., Application of Sparse Nonlinear Programming to Trajectory Optimization, J. Guidance, 1990, pp. 198-206, vol. 15, No. 1, U.S.A.

Betts, John T. and Huffman, William P., Path-Constrained Trajectory Optimization Using Sparse Sequential Quadratic Programming, *Journal of Guidance, Control, and Dynamics*, 1993, pp. 58-19, vol. 16, No. 1, Jan.-Feb. 1993, U.S.A.

C. Hsu, G. Alt, Z. Huang, E. Beier, B. Bruderlin, A Constraint-based Manipulator Toolset for Editing 3D Objects, *Solid Modeling '97*, 1997, pp. 168-180, Atlanta, Georgia.

Tim Alibozek, Smart software builds a better harness, *Machine Design*, May 7, 1998, pp. 89-92.

Terrence Fernando, Norman Murray, Kevin Tan, Prasad Wimalaratne, Software Architecture for a Constraint-based Virtual Environment, *VRST 99*, 1999, pp. 147-154.

Jian Hu, Sachin S. Sapatnekar, *A Timing-constrained Algorithm for Simultaneous Global Routing of Multiple Nets*, pp. 99-103.

* cited by examiner

CONSTRAINT-BASED METHOD OF DESIGNING A ROUTE FOR A TRANSPORT ELEMENT

FIELD OF THE INVENTION

The present invention relates generally to methods for designing a route for a transport element, such as tube, and, more particularly, to methods for designing a route for a transport element based upon at least one path constraint that limits the possible routes for the transport element.

BACKGROUND OF THE INVENTION

Transport elements, such as tubes, cables, hoses, wires, wire bundles and the like, are widely used in a great variety of applications. For example, a jet airliner contains approximately 3,000 custom-designed metal tubes in a number of different systems including the hydraulic system, pneumatic system, fuel system, drainage system, fire suppression system and the like. In many of these applications, the tubes must be carefully designed in order to be manufacturable and installable. For example, the design of each tube carried by a jet airliner typically takes about 40 hours on average.

A tube is one type of transport element that poses a number of challenges in its design due to limitations upon the way in which the tube may be bent as described below. By way of background, tubes are composed of straight sections joined by circular arcs. As a result of constraints placed upon tube design by the manufacturing process, the straight sections and circular arcs each have a minimum length such that it is impossible to have an arbitrarily small bend, and one bend cannot begin an arbitrarily small distance from another bend. As shown in FIG. 1, a tube generally includes a starting point, designated the A-end, and an ending point, designated the B-end, and at least one bend defined or determined by a node, e.g., $N_1$, therebetween. With respect to the node terminology, it is noted that for certain classes of curves, nodes are also called control polygon vertices. Since the straight segments 2 of a tube are joined by arcuate segments 4, the tube does not pass through the nodes which, instead, are imaginary points where the two adjacent straight sections would intersect if extended far enough as designated by $N_1$ and $N_2$ in FIG. 1. A transport element may therefore be defined in terms of its nodes supplemented by some additional information depending upon the type of transport element. In the case of a metal tube, for example, the additional information may include the radius at which the tube is bent at each bend, although typically a metal tube is bent at the same radius at each bend. For other types of transport elements, such as hoses, the additional information may include the order of the spline that defines the type of curved route followed by the transport element, the tangent direction of the transport element at each node, etc..

While nodes are an effective representation of a tube, the use of nodes in the design of tubes may sometimes create problems. For example, a tube design may require a predetermined standoff S at the B-end, such as for tool access, as shown in FIG. 2. In this regard, standoff refers to the length of the straight segment adjacent to either the A-end or the B-end. Traditional design practice is to position the node N a sufficient distance from the B-end to provide the designated standoff. However, if the segment of the tube upstream of node N is modified as shown in FIG. 3, the standoff S' will shrink to an unacceptable level even though the node that defined the standoff was supposedly correct. Even though the node does not define the standoff directly and may therefore be somewhat problematic during the design process, nodes are frequently utilized in the design of tubes because of their simplicity and convenience.

When designing the route of a transport element, such as tube, a designer initially develops a gross route or sketch which is a simple description of a relatively restricted set of possible routes. The gross route may be developed mentally by the designer and is typically based upon the starting and end points as well as various obstacles, way-points, etc. that are located therebetween. In designing the gross route, a designer generally designs it to comply with a number of extrinsic or situation-dependent constraints that include, for example, the minimum separation from structures or other tubes, requirements that the tube be parallel to certain structures, requirements that the tube penetrate certain structures within a particular zone, etc. While termed a route, the gross route that is designed generally defines a class of topologically equivalent routes that satisfy the various constraints. Based upon the gross route, a designer can select a specific route for the transport element. Unfortunately, designers do not generally select the specific route to be optimal for a transport element and have no techniques for doing so.

Given a gross route, the specific route of a transport element is generally designed by manual drafting in a computer-aided design (CAD) system such as CATIA. This manual drafting is typically a slow and difficult process. In the case of a metal tube, it may appear that a tube centerline extending from the A-end to the B-end may be easily constructed by merely specifying some intermediate way-points at which the tube will be attached to structures at particular orientations and then having the CAD system fill in straight lines and tangential circular arcs between the A-end, the B-end and the intermediate way-points. The difficulty lies, however, in ensuring that the resulting route is manufacturable, satisfies engineering constraints and is optimal.

In the case of metal tubes, for example, the manufacturing process dictates a variety of intrinsic constraints, such as minimum bend angle, maximum bend angle, minimum straight section length between bends, constraint bend radius, etc. These constraints typically arise from the nature of tube bending machines. Generally, a tube bending machine starts with a straight piece of tubing stock and repeatedly performs various operations including shooting out a certain length of tube stock to generate a straight section, bending or wrapping the tube around a circular die to generate a circular arc, and rotating the tube about its longitudinal axis to establish a new plane for the next bend. Typically, it is expensive to change the circular die. As such, each bend in a tube preferably has the same radius. In addition, the machine must be able to grip the stock during the formation of a bend such that the bending head has a certain amount of clearance, i.e., a new bend cannot be started arbitrarily close to the previous bend. The requirement that the tube stock be gripped during bending operations therefore results in the requirement of a minimum straight section length. These constraints are termed intrinsic constraints since they apply to every tube no matter where the tube is situated.

In designing the route for a tube on a CAD system, the designer essentially lays down one straight segment after another or, equivalently, defines one node after another with the circular arcs connecting these straight sections being interpolated automatically. A variety of CAD systems are available including CATIA, Solid Edge and Pro/Engineer. Typically, these systems offer the designer assistance in placing the next segment by providing something like a compass, that is, a graphical icon depicting a local three-dimensional (3D) coordinate system. In CATIA and similar systems, the designer can place the compass anywhere in the scene, usually by using existing geometry as a base of reference. For example, if the designer wants the next section of a tube to be parallel to a particular facet of a solid, the designer can place the compass on the facet, and indicate which of its three planes is to be "paralleled." The next tubing section is automatically constrained to lie parallel to that plane. The compass is therefore essentially a way of turning an inherently 2-D input device, such as a mouse, into an effective 3-D input device.

The compass is a particularly flexible tool because the designer can choose any of its planes or axes to constrain the location of the next segment. The compass can also be used to establish planes that cannot be penetrated during the drawing process. For example, when routing a tube near a piece of machinery from which there must be a certain amount clearance, the designer can use the compass to establish a plane defining an impenetrable barrier at the appropriate distance from the machinery. Therefore, any attempt to move the mouse beyond that plane will fail and the system will provide some kind of signal, e.g., a flash, a buzz, or simple refusal to draw beyond the barrier.

Nevertheless, the compass, and all the operations it supports, still amount to an essentially manual drafting process. As shown in FIGS. 4a-4d, the designer draws one segment of the tube, which is then frozen, and then proceeds to the next section, and so on. With respect to the sequential example provided by FIGS. 4a-4d, the tube design is frozen to the left of the dotted line. As soon as a new segment is drawn, the necessary circular arc is interpolated between the new segment and the previous segment as indicated by the dashed lines in FIGS. 4a-4d. Most CAD systems allow the designer to input minimum bend angles, minimum straight segment lengths and the like and, if the designer draws a tube segment that violates these rules, a warning is provided which may simply involve the failure to construct the tube as requested. However, conventional CAD systems do not provide the designer with any alternative suggestions for a comparable tube segment that would comply with the rules and does not consider any redesign of the previously frozen portion of the tube design. Following completion of a portion of the tube routing, the CAD system simply checks the route for compliance with various rules in a post hoc manner. For example, the CAD system may check the route to ensure that the segment just designed has a certain minimum length. One example of the CAD system for routing transport elements that offer a post hoc check, albeit a rapid and interactive one, is the TubeExpert CAD program provided by Oettinger Gmbh of Oberursel, Germany. If the post hoc check determines that one or more of the segments does not comply with the rules, the route of the transport element must be redesigned, thereby consuming a significant amount of additional time and resources.

Once a transport element is designed, it may be desirable to modify it. For example, consider the initial route of a tube depicted in FIG. 5. If the nodal point $N_4$ were moved upward, a typical CAD system would change only that portion of the route of the tube that is local to the node that is being moved. In other words, typical CAD systems would change only the straight segments $N_3$-$N_4$ and $N_4$-$N_5$, as well as the arcs that connect these straight segments. The remainder of the tube would remain fixed since conventional CAD systems do not embody any concept of global optimality for transport elements. In other words, conventional CAD systems do not support global changes to the route of a transport element as a result of local influences or changes. As shown in FIG. 6, modern CAD systems therefore view a tube as a linkage of ball joints and telescoping joints. As $N_4$ moves upwards, the joints or links that are circled in dashed lines in FIG. 6 are free to accommodate this movement, but the other joints or links are frozen so that the transformation of the route of the tube occurs as shown in FIG. 7.

The portion of the transport element that drives or originates the modification need not be a node. For example, the designer may wish to move an entire straight segment, such as the segment between $N_3$ and $N_4$. If this segment were moved upward such as in response to the moving of a clamp through which this segment of the tube must pass, the route of the tube would be varied as shown in FIG. 8 in which the clamp is indicated by a rectangle. It should be noted, however, that the tube still changes shape only via the minimal, local subset of joints or links necessary to allow the upward motion of the $N_3$-$N_4$ segment.

Conventional CAD systems permit the route of tubes to be pushed or pulled into another shape only so long as the tube continues to have the same number of nodes. Thus, conventional CAD systems do not permit one route of a tube to be continuously deformed into another route unless those routes have the exact same number of nodes or bends. Stated another way in CAD terminology, a tube cannot be "rubber banded" into another tube unless they both have the same number of bends. Accordingly, if the route of the tube must have a different number of nodes, the existing route cannot simply be pushed or pulled into another shape, but a new set of nodes must be determined. In this regard, FIG. 9 depicts the tube extending from a fixed fitting 10 to a bulkhead 12 of an aircraft. If the position of the bulkhead changed as shown in FIG. 10, the set of nodes for the tube would also have to change. Although similar to the route depicted in FIG. 9, the route of the tube depicted in FIG. 10 would be considered a new design by conventional CAD systems and would have to be completely redesigned, i.e., conventional CAD systems do not regard the number and placement of nodes as parameters that the system is free to adjust; rather, they are seen as constants determined by the designer with which the system must work. As such, conventional CAD systems require the designer to foresee the possible future rotation of the bulkhead and to design corresponding freedom in the linkage sense of FIG. 6. Since designers cannot predict the future, this requirement may go unmet in many instances.

By way of another example, a tube may be required to be attached to a structural element 14 as shown in FIG. 11. Most modern parametric CAD systems allow the designer to represent the clamp by associating a mathematical constraint between a point, edge or face of the structural element and an intermediate segment of the tube. Thus, if the structural element were moved downward, the route of the tube may be changed on a local basis as described above and as depicted in FIG. 12. In this regard, some CAD systems also require the designer to specify the joints and links that are free to move. For example, with respect to the route of the tube depicted in FIG. 12, in order to accommodate the downward movement of the structural element, the straight segments 16 of the tube on either side of the structural element may be elongated and the intermediate tube segment 18 may be shrunk, or the intermediate tube segment may maintain a constant length while permitting the straight tube segments on either side to stretch and all four nearby angles 20 to vary. In other words, the CAD system may not necessarily have a predefined rule or principle for determining the joints and links that are free and the joints and links that are frozen and may, instead, require input from the designer.

In contrast to the downward movement of the structural element, upward movement of the structural element can cause the route of the tube to approach an illegal configuration in which the minimum bend angle would be violated at bends 22 as shown in FIG. 13. In this regard, it is important to note that angles α are conventionally measured supplementarily as indicated in FIG. 13. While the upward movement of the structural element may be accommodated either by moving the outboard clamps downward such that the tube may assume a straight line or introducing additional nodes or bends, each of these solutions requires that the tube be redesigned in the eyes of conventional CAD systems by requiring a different number and general placement of the nodes.

Therefore, while a number of CAD systems are currently available for assisting in the design of a route of a transport element, such as a tube, these CAD systems do not support as much flexibility in the design process as would be desired. In this regard, conventional CAD systems may alert the designer if a new segment does not meet a particular constraint, or if the design as a whole does not meet one or more constraints. However, conventional CAD systems do not use the constraints to drive or generate the design and/or to provide a measure of the merit of the design. In addition, modern CAD systems only support limited modification of existing routes since modern CAD systems generally only permit the sections local to the portion of the route being modified to move. As such, designers may be unable to modify an existing route of a transport element to accommodate a change in some instances and would, instead, have to redesign the set of nodes, thereby consuming additional time and resources.

SUMMARY OF THE INVENTION

An improved method for designing the route of a transport element, such as a tube, is provided. The method preferably designs the route automatically and, by utilizing constraints in the design of the route, as opposed to during a post design check, ensures that the resulting route complies with the various constraints. In addition, the method of the present invention may establish a selection criterion to evaluate a plurality of feasible routes of the transport element that each comply with the constraints such that a preferred or optimal route may be designed.

According to one embodiment, a method for designing the route of a transport element initially establishes at least one constraint that limits possible routes for the transport element. For example, the constraint may be a path constraint based upon the background structure or inserted by the designer with no correlation to the background structure. The constraint may be an intrinsic constraint that is independent of the background structure and is instead dependent only upon the shape of the transport element itself. For example, the intrinsic constraint may be the minimum bend angle and/or the minimum straight segment length. According to this embodiment, the constraint may be an inequality constraint that limits the possible routes for the transport element without fixing uniquely or precisely the position of any portion of the transport element. In this regard, the inequality constraint defines a limit that must be maintained during the design of the route of the transport element.

The constraints need not be independent of one another. Instead, a relationship may be established between two or more of the constraints. This relationship is then taken into account in the eventual definition of the route.

The method of this embodiment also establishes a selection criterion for evaluating the possible routes for the transport element. In one embodiment, the selection criterion is defined in terms of one or more design characteristics including, but not limited to, the length, number of bends, the flow resistance and the compliance of the transport element. Thereafter, the route for the transport element is automatically defined in accordance with the path constraints and pursuant to the selection criterion. In automatically defining the route of a tube, for example, the method automatically defines a plurality of nodes along the route.

In one embodiment, one or more constraints are defined in terms of a preferred value and cost for variances from the preferred value. In this embodiment, the selection criterion preferably incorporates the cost of variances. As such, the route may be automatically defined so as to minimize the cost of the variances, by way of example.

The method of the present invention is also applicable to bundle routing in which two or more transport elements are routed simultaneously. In this regard, the routes of the respective transport elements may be optimized at the same time. For example, one or more of the constraints that drive the routes of the transport elements may be based upon a relationship of one transport element to one or more of the other transport elements, thereby requiring that the routes of the transport elements be optimized simultaneously.

The constraint established in accordance with this embodiment of the present invention may also be based upon the route of a model transport element. In this regard, the establishment of the constraint may include establishing a first plane containing a portion of the model transport element in which the route must remain and establishing second planes extending in parallel to respective segments of the model transport element and perpendicular to the first plane which limit the proximity of the route to the respective segments of the model transport element. In this embodiment, the selection criterion is preferably established to take into consideration the spacing of each segment of the transport element from the second plane associated with the respective segment of the model transport element. As such, the route will be established so as to lie as close as possible to the second planes associated with the respective segments of the model transport element, while not approaching the model transport element any more closely than the second planes.

The selection of the nodes in terms of the number of nodes and the ordering of the nodes with respect to the path constraints as well as the concomitant continuous optimization of the number and positions of the nodes can be formulated as a mixed integer problem and solved by a generic mixed integer solver. According to another embodiment, however, the method for designing a route for a transport element between a pair of end points performs these functions heuristically by establishing at least one constraint that limits the possible routes for the transport element and then constructing an initial route for the transport element having at least one node and satisfying each constraint. A trial route extending straight between the pair of end points is also established and is then modified by adding at least one node from the initial route to the trial route until a feasible route that satisfies each constraint is constructed. The trial route includes at least one segment, wherein segment is defined as a straight line extending between two nodes. For each segment, the deviation between each node of the initial route that lies between the pair of nodes defining the respective segment of the trial route and the respective segment of the trial route is determined. Nodes from the initial route are then sequentially added to the trial route based upon the deviation of the respective nodes beginning with the node having the largest deviation. After adding each node from the initial route to the trial route, the position of the new set of nodes is optimized in a continuous sense and, as a side effect of the process, i.e., by the success or failure of the optimization process, a determination is made if the modified trial route is feasible. Prior to constructing the final route, this optimization may either be complete or partial.

According to this embodiment, the method may also obtain a measure of the optimality of the best achievable modified trial route following a determination that the modified trial route is feasible. In an embodiment of the principle that fewer nodes are generally preferably to more nodes but only to a point, at least one more node from the initial route may be added to the trial route and another measure of the optimality of the further modified trial route may be obtained following the addition of the at least one more node. An improvement threshold may also be defined. As such, the addition of at least one more node from the initial route to the trial route and the subsequent measurement of the optimality of the further modified trial route may be continued so long as the measurement of the optimality of the further modified trial route exceeds the measurement of the optimality of the immediately preceding modification of the trial route by at least the improvement threshold, i.e., so long as the optimality increases quickly. Once the optimality of the further modified trial route fails to exceed the optimality of the immediately preceding trial route by the improvement threshold, the most recently added node is removed so as to return to the immediately preceding trial route, subject in some embodiments to looking ahead to determine if the addition of one or more additional nodes returns the trial route to an acceptable level of optimality. This threshold can be used to define essentially a level of fineness or detail in the node structure.

According to another aspect of this embodiment to the method, one or more nodes may be deleted from the modified trial route upon completion of the process of adding the nodes from the initial route to the trial route. The deletion of the nodes is based upon the deviation of the respective nodes beginning with the node of the modified trial route having the smallest deviation from the final route. Once the node has been deleted, the feasibility and optimality of the modified trial route are determined. Further deletion of nodes from the modified trial route is halted upon determining either that the modified trial route is infeasible or that the deletion of the node caused the optimality of the modified trial route to decrease by more than a predetermined amount, subject in some embodiments to looking ahead to determine if the deletion of one or more additional nodes returns the trial route to feasibility and to an acceptable level of optimality. Once the further deletion of nodes from the modified trial route is halted, the node that was most recently deleted is again added to the modified trial route such that the resulting modified trial route is again feasible and optimal. As such, the method of this embodiment of the present invention provides an effective technique for constructing the route of a transport element that satisfies the various constraints and is optimized relative to other potential routes.

According to another embodiment of the present invention, a route is designed for an additional transport element that is at least partially based upon the route of a model transport element. In this embodiment, a space through which the route of the additional transport element will extend is defined based at least in part upon the route of the model transport element. The defined space is sized such that a plurality of candidate routes for the additional transport element will extend therethrough. The space that is defined may advantageously be a sleeve surrounding the model transport element and through which the route of the additional transport element will extend. For example, the sleeve may be an annular sleeve having an opening through which the model transport element extends. Once the space has been defined, the route of the additional transport element is selected from among the plurality of candidate routes, typically based upon a predetermined selection criterion. As such, the method of this aspect of the present invention permits additional transport elements to be routed alongside existing transport elements. While the additional transport element may not necessarily be parallel to the model transport element, the route of the additional transport element may be more readily optimized due to the flexibility of positioning the additional transport element anywhere within the space defined about the model transport element.

According to another embodiment of the present invention, the route for a transport element is designed by establishing a selection criterion for evaluating the possible routes for the transport element. The possible routes for the transport element are governed by a number of constraints, at least some of which may be soft constraints, that is, constraints that have a predefined preferred value but that permit variations therefrom. The selection criterion of this embodiment is therefore based at least in part upon a penalty or weighting assigned to variances in the soft constraints from the respective preferred values. The penalty or weighting is also sometimes termed a barrier function or a penalty function. The route for the transport element is then defined in accordance with the selection criterion. Following the definition of the route, the respective weights assigned to variances of one or more of the constraints may be adjusted and the route for the transport element may be redefined in accordance with the revised selection criterion. The adjustment of the respective weights assigned to variances of one or more of the constraints and the redefinition of the route for the transport element may be repeated as desired. As such, the method of this embodiment permits the relative importance or value of different constraints remaining in compliance with their respective predefined preferred values to be reflected in the respective weightings, while offering a designer the flexibility to alter the relative weightings in order to determine the manner in which the route of the transport element will change. In this regard, the adjustment of the weightings is generally a much easier way to achieve a design goal than the adjustment of the geometry of the transport element.

Therefore, the various embodiments of the method of the present invention permit the route of a transport element to be automatically defined in accordance with one or more constraints. As such, the constraints are taken into account during the design of the entire route since they drive the design rather than merely serving as post hoc checks, the violation of which would require the route to be redesigned. Additionally, the method for designing the route of a transport element establishes a selection criterion to permit the route that is automatically defined to be optimized pursuant to the selection criterion. By establishing different types of selection criterion, different routes may be defined based upon the requirements of a particular application. Additional embodiments of the present invention further improve the method by permitting relationships to be established between two or more of the constraints and permitting the route to be automatically defined while maintaining intrinsic constraints such as a predetermined minimum bend angle and a predetermined minimum straight segment length. Additionally, the route of the transport element may be based upon and proximate to a model transport element, if desired. The method may also provide a technique for routing multiple transport elements simultaneously, as in a bundle or ensemble, by establishing constraints between the multiple transport elements, as well as possibly basing the selection criterion in part on the relative configurations of the transport elements. While the method is advantageous for designing the route of tubes, the method may also be utilized to design the route of other transport elements including cables, hoses, wires, wire bundles and the like.

BRIEF DESCRIPTION OF THE DRAWINGS

Figure 1:
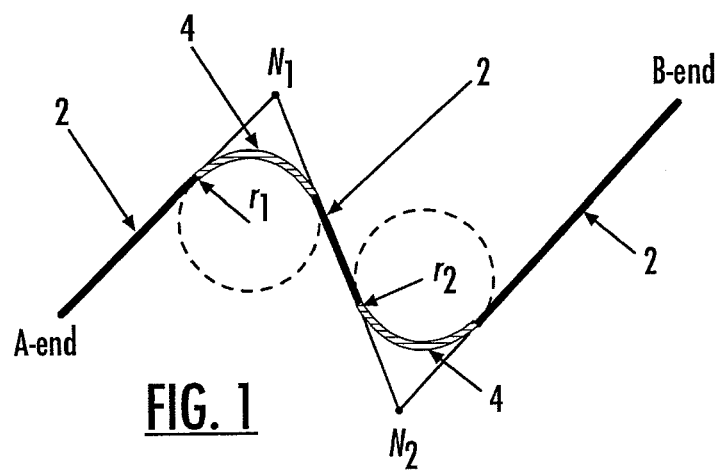
Figure 2:
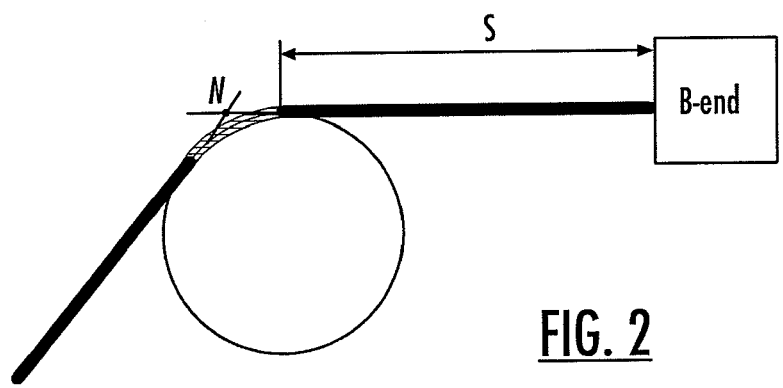
Figure 3:
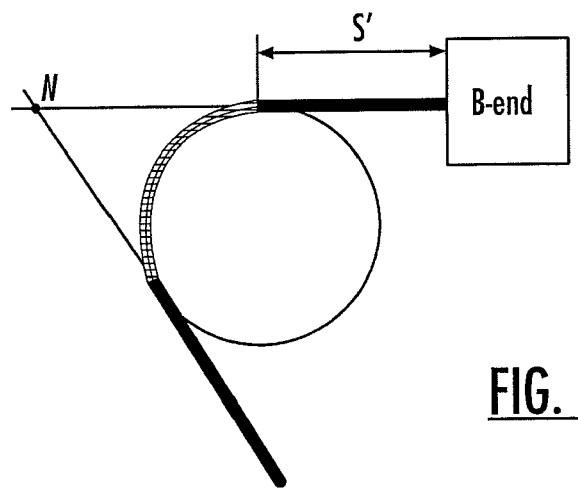
Figure 4A:
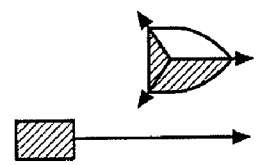
Figure 4B:
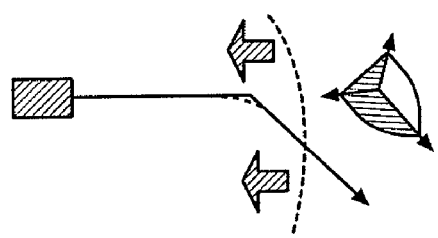
Figure 4C:
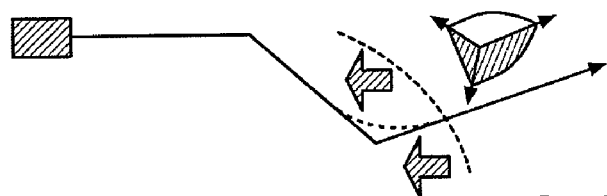
Figure 4D:
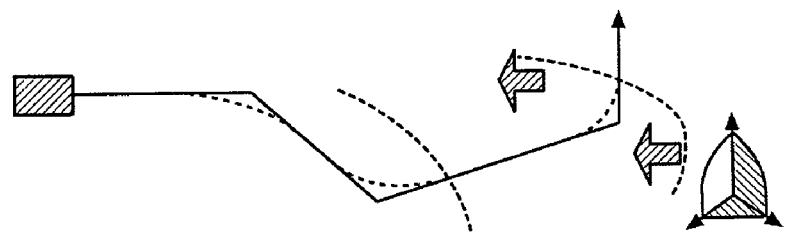
Figure 5:
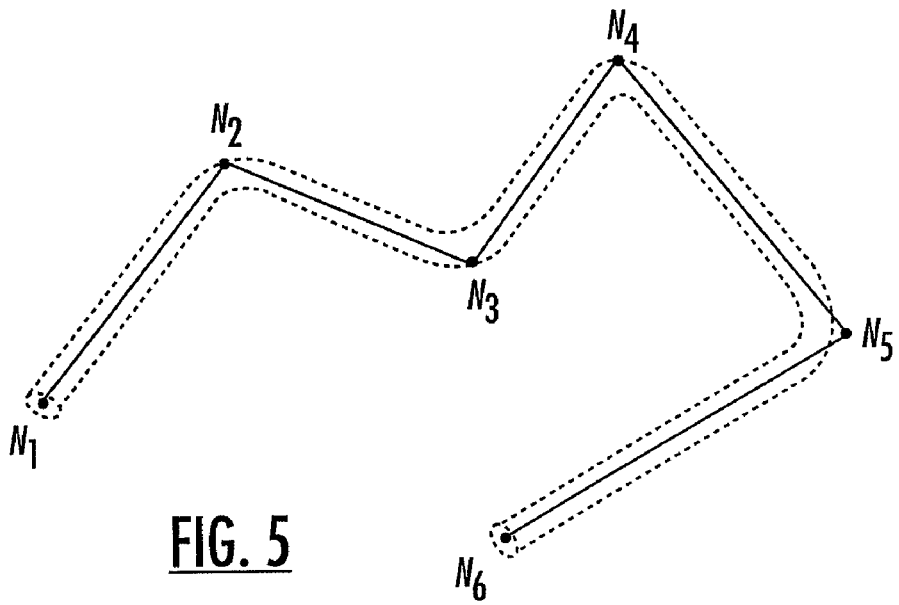
Figure 6:
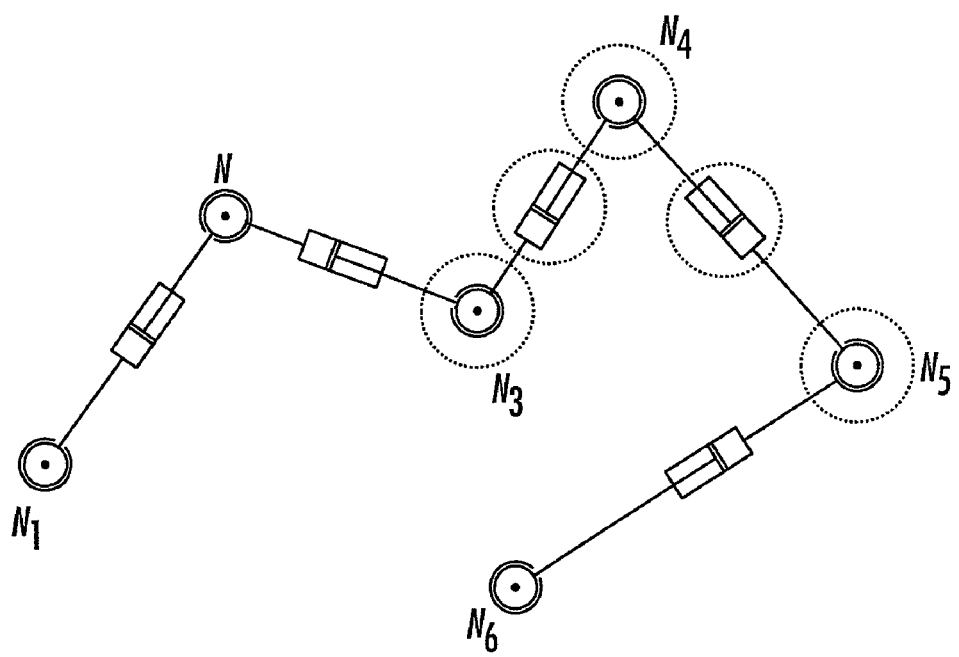
Figure 7:
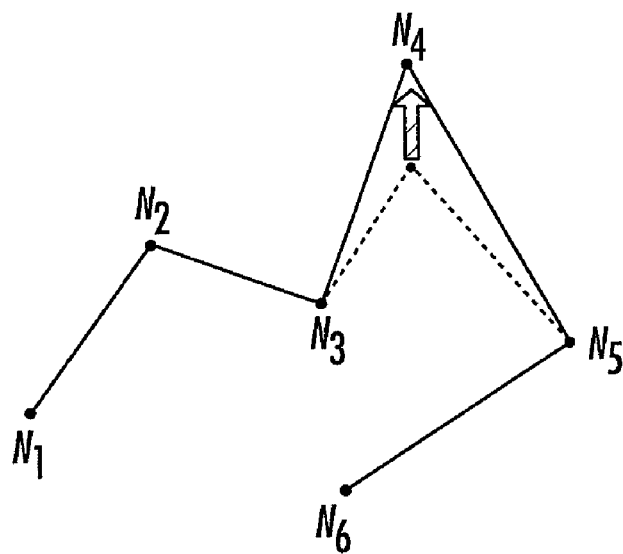
Figure 8:
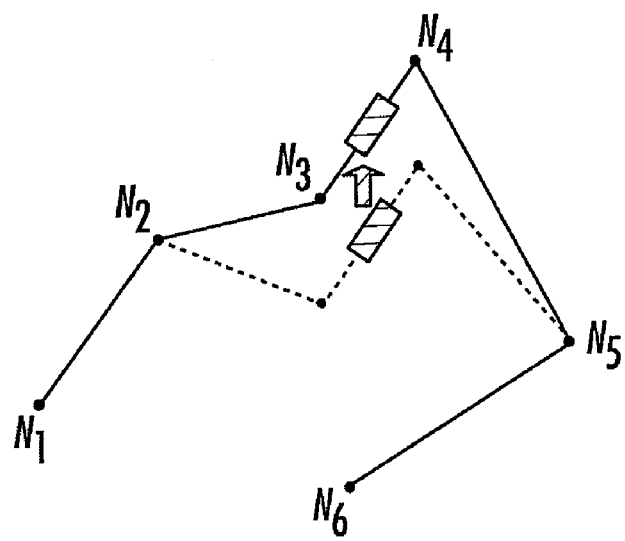
Figure 9:
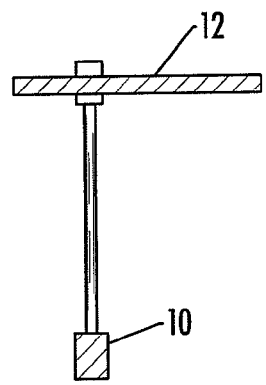
Figure 10:
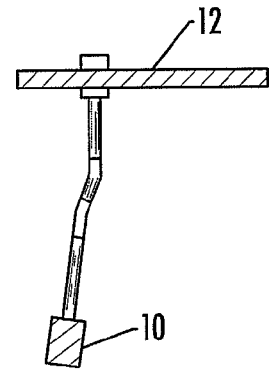
Figure 11:
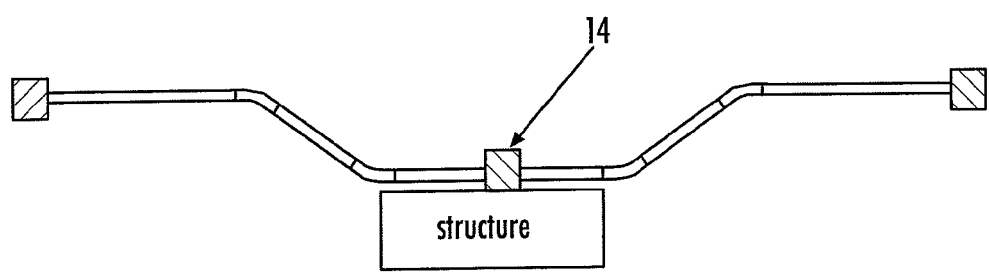
Figure 12:
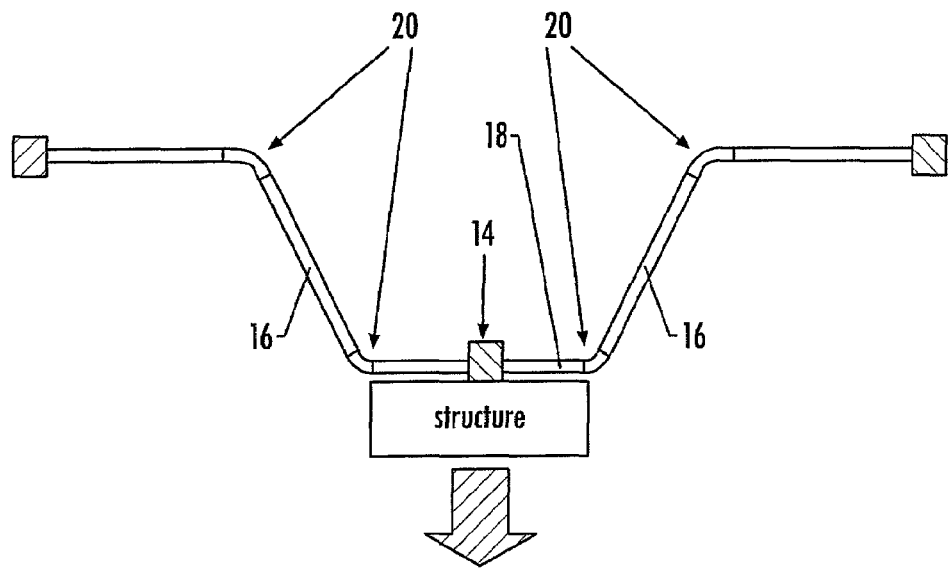
Figure 13:
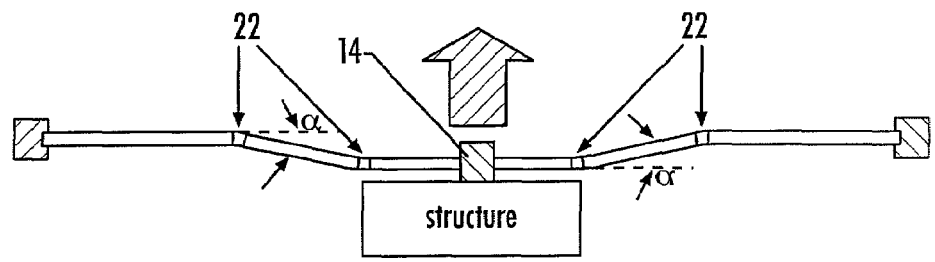
Figure 15:
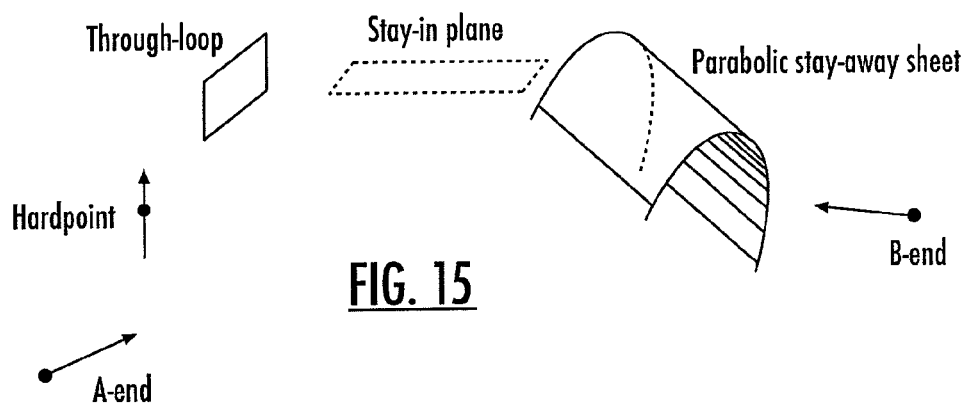
Figure 16:
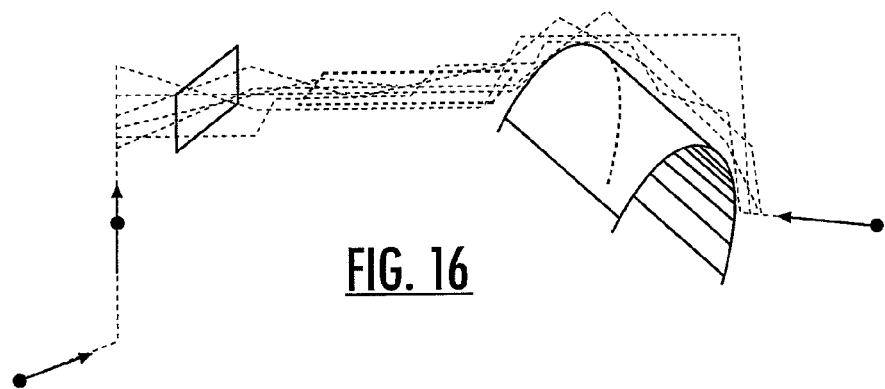
Figure 17:
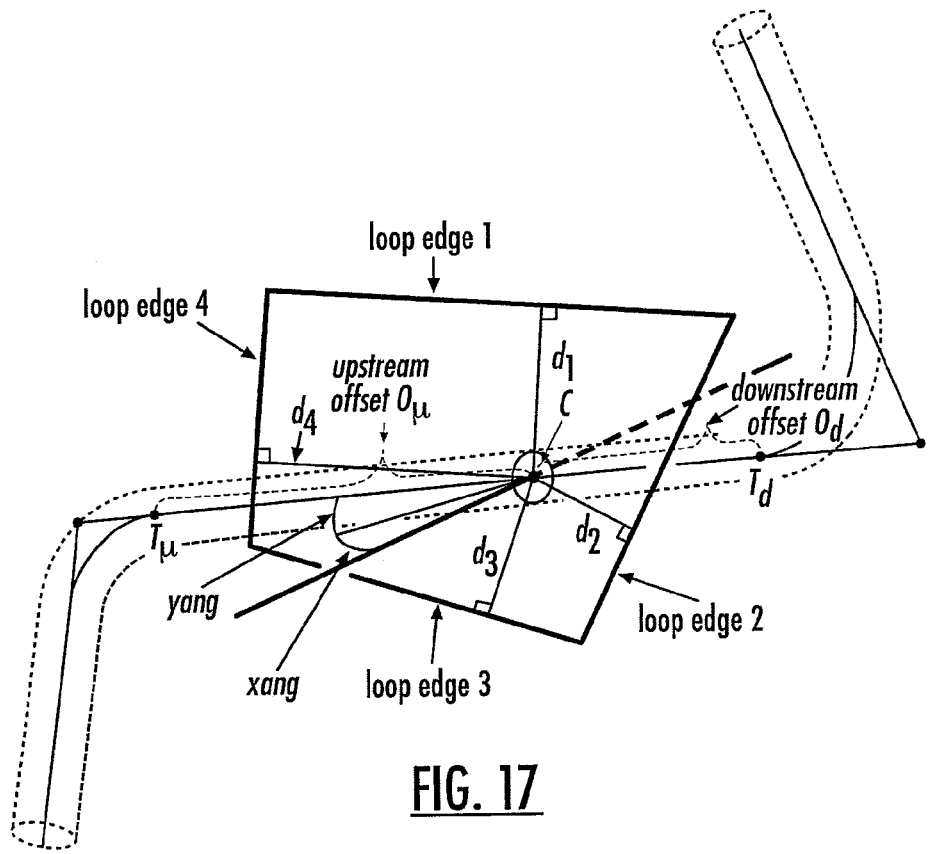
Figure 18:
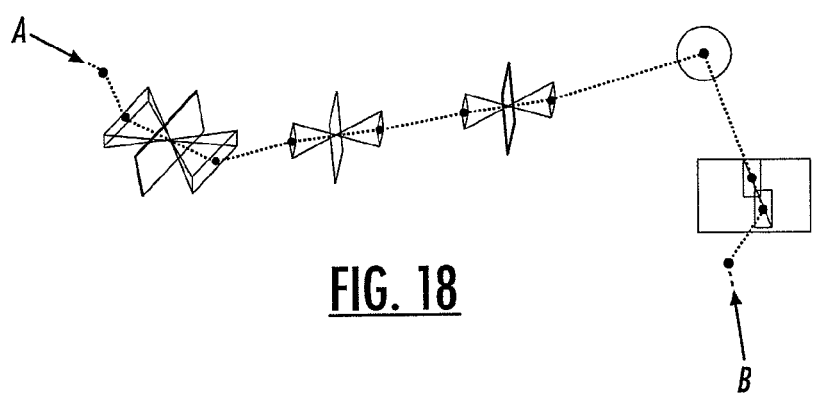
Figure 19:
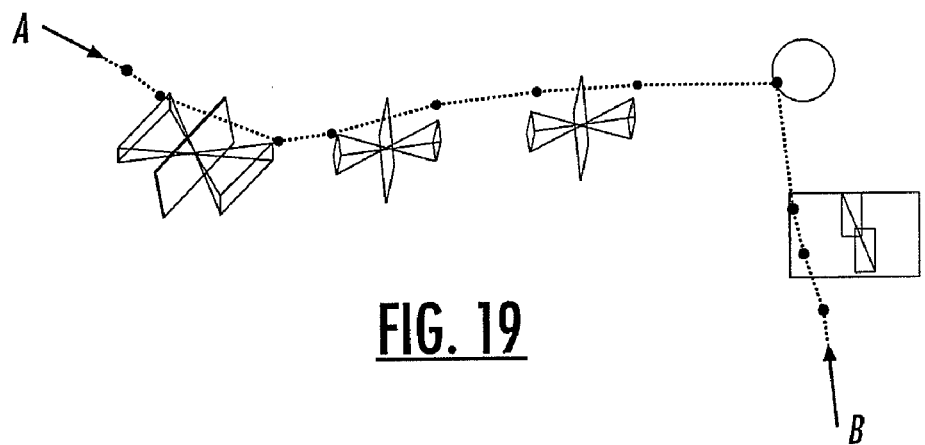
Figure 20:
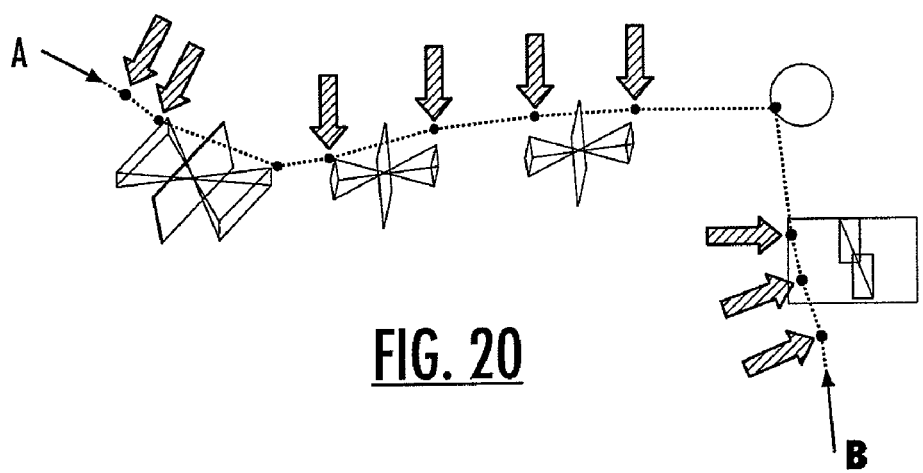
Figure 21:
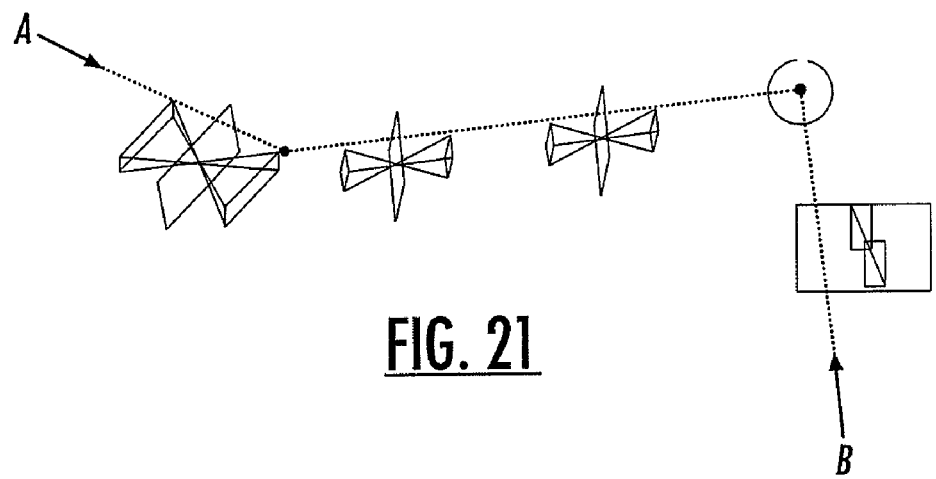
Figure 22:
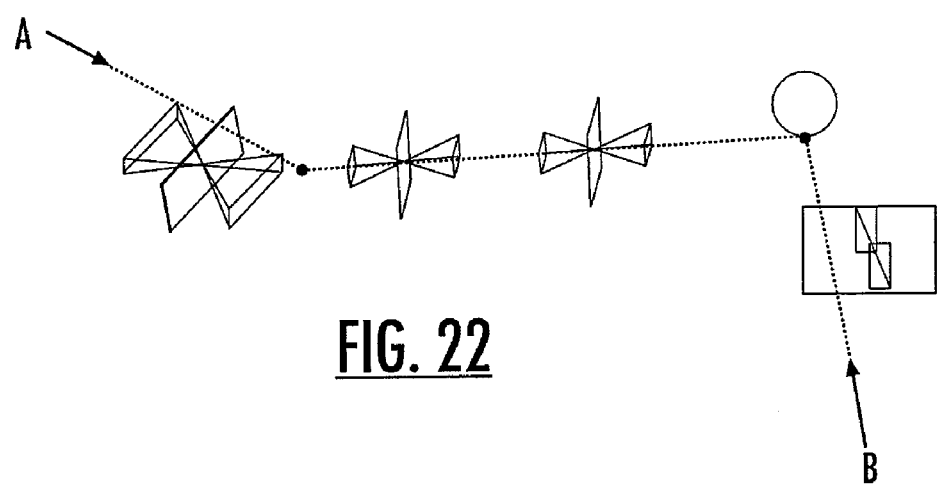
Figure 23:
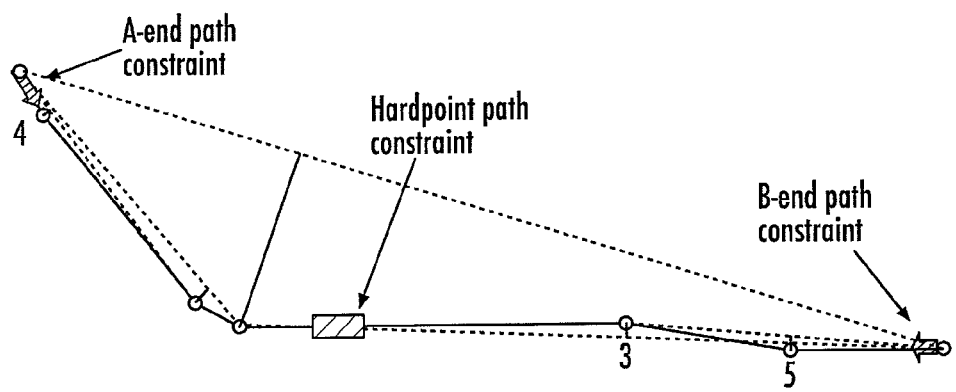
Figure 24:
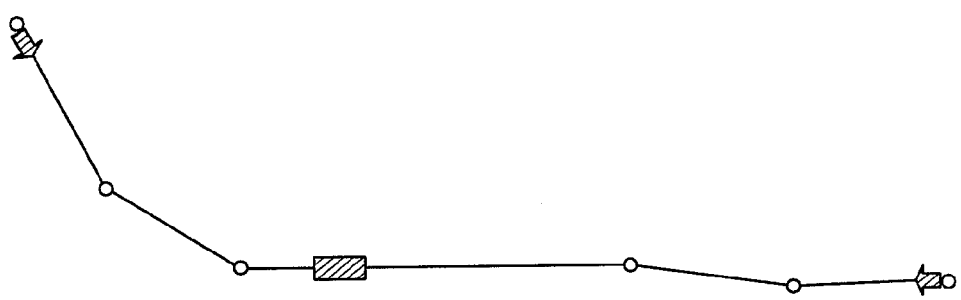
Figure 25:
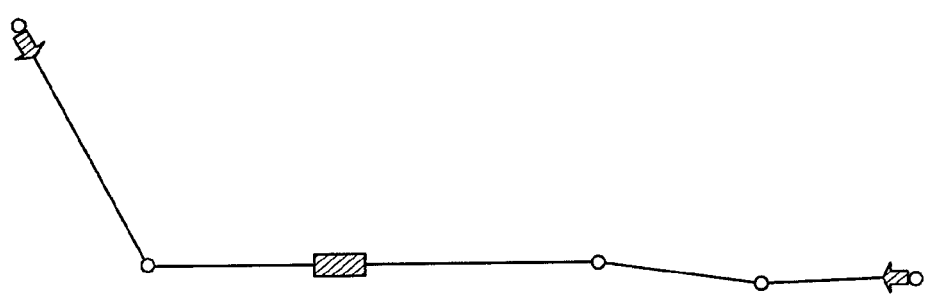
Figure 26:
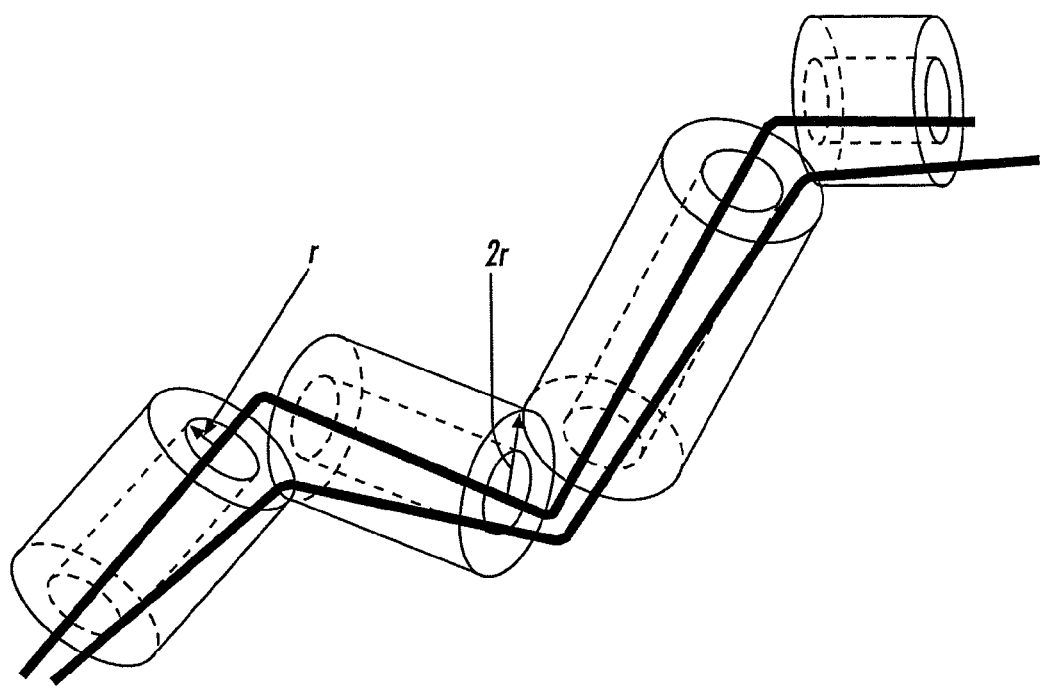
Figure 27:
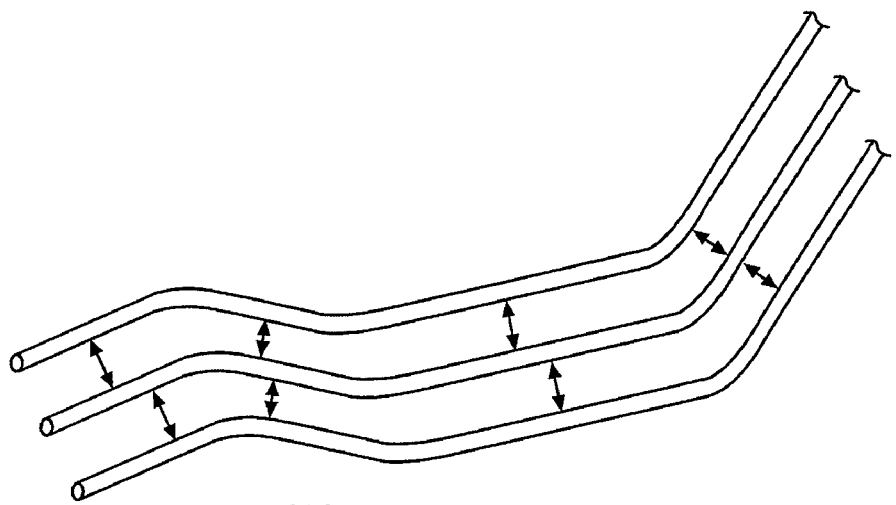
Figure 28:
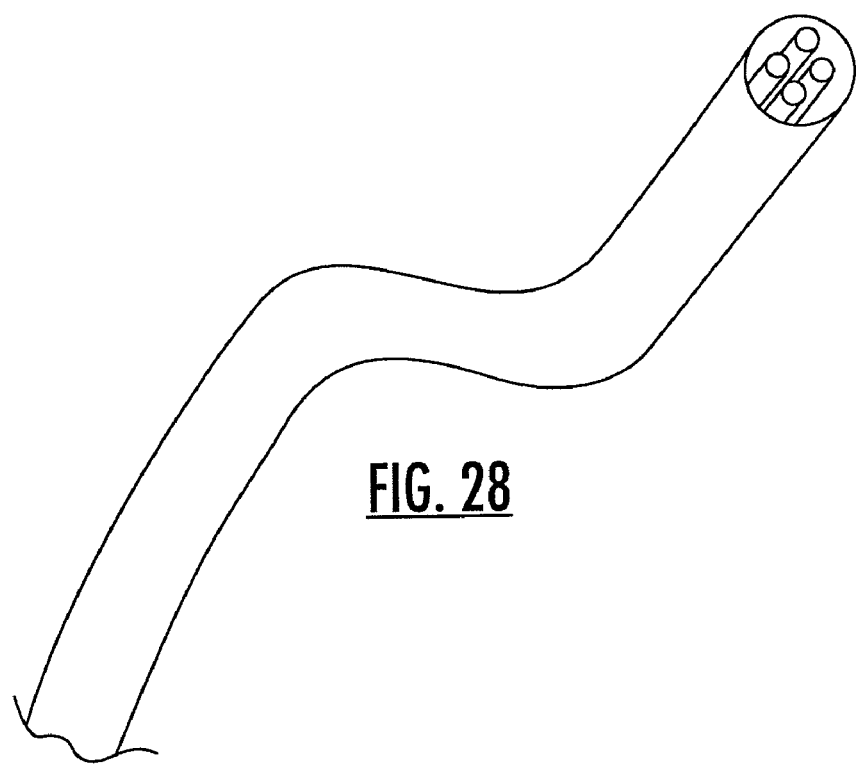

Having thus described the invention in general terms, reference will now be made to the accompanying drawings, which are not necessarily drawn to scale, and wherein:

FIG. 1 illustrates the route of a tube depicting three straight segments joined by two circular arcs;

FIG. 2 illustrates the desired standoff distance from the B end of a tube;

FIG. 3 illustrates a violation of the desired standoff caused by altering the position of one of the tube segments even though the node remains at the same location;

FIGS. 4A-4D are sequential views depicting the design of the route of a tube with the use of a three dimensional compass provided by CATIA, for example;

FIG. 5 is a representation of the route of a tube having six nodes designated $N_1$-$N_6$;

FIG. 6 is another representation of the route depicted in FIG. 5 in which the nodes are illustrated as ball joints and the straight segments are illustrated as telescoping joints;

FIG. 7 is a representation of the route of the tube depicted in FIG. 5 in which node $N_4$ is moved upward as indicated by the arrow;

FIG. 8 is another representation of the route of the tube shown in FIG. 5 in which a clamp is moved upward;

FIG. 9 depicts a tube extending between a fitting and a bulkhead;

FIG. 10 illustrates another tube extending between the same fitting and the bulkhead after the position of the bulkhead has been changed relative to the bulkhead position depicted in FIG. 9;

FIG. 11 is a representation of the route of another tube having an intermediate portion connected to a structural element by means of a clamp;

FIG. 12 is another representation of the tube of FIG. 11 following movement of the structural element downward;

FIG. 13 is another representation of the tube of FIG. 11 following movement of the structural element upward;

FIGS. 14A-14F are graphical representations of a plurality of path constraints;

FIG. 15 is a graphical representation of a plurality of path constraints, possibly based upon background structure;

FIG. 16 illustrates a plurality of candidate routes that comply with each of the path constraints depicted in FIG. 15;

FIG. 17 is a representation of a portion of the route of a tube that extends through a rectangular through loop and which illustrates a plurality of low level constraints that arise in the course of complying with the path constraint imposed by the rectangular through loop;

FIG. 18 is a representation of a plurality of path constraints as well as a gross route that is feasible in that it complies with each of the path constraints without necessarily being optimized in a continuous sense and while likely including an overpopulation of nodes;

FIG. 19 is an improved route that is also feasible in that it satisfies each of the path constraints and that is optimized relative to the gross route depicted in FIG. 18, at least in terms of length since the route depicted in FIG. 19 is shorter;

FIG. 20 again depicts the route shown in FIG. 19 with a number of nodes that might possibly be deleted identified by arrows;

FIG. 21 is a representation of another route that is feasible in that it satisfies each of the path constraints following removal of the nodes identified in FIG. 20;

FIG. 22 is an optimal route that satisfies each of the path constraints and that is based upon the route that identified by FIG. 21 following optimization of each node location;

FIG. 23 illustrates a trial route having a plurality of nodes with an indication of the deviation of each node;

FIG. 24 is a representation of the route of a tube following a forward sweep based upon the trial route depicted in FIG. 23;

FIG. 25 is a representation of a route of the tube following a reverse sweep of the nodes of the route depicted in FIG. 24;

FIG. 26 is a representation of the plurality of sleeves that surround respective segments of an existing tube in order to define a permissible region through which a new tube may extend;

FIG. 27 is a representation of a plurality of transport elements capable of being simultaneously routed, as in a bundle, in which inter-transport element constraints are represented by the double headed arrows; and FIG. 28 is a representation of a meta-transport element having a shape sufficient to contain a plurality of individual transport elements, thereby also supporting the simultaneous routing of a plurality of transport elements, as in a bundle.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The method of the present invention is adapted to design a route for a transport element. By way of example, the method will be hereinafter described in conjunction with the routing of a tube, such as the routing of a tube within an aircraft. However, the method is equally applicable to routing a tube in applications other than an aircraft, as well as to the routing of transport elements other than tubes, such as cables, hoses, wires, wire bundles and the like. Additionally, the application of the method to the of routing a tube will be described hereinafter to generate a route generally consisting of one or more straight segments joined by circular arcs. Such a curve is an arc-spline, with the restriction that alternate arcs have a finite or infinite radius. This class of curve is advantageous as an example since it demonstrates the capability of the present invention to effectively choose the representation scheme, i.e., the number of nodes and their ordering with respect to the constraints. However, the method of the present invention is capable of designing the route of a transport element so as to be defined by other classes of curves or splines, if so desired. It should also be understood that transport element is intended to refer generically to both a single continuous and integral transport element and a series of transport elements interconnected one to another.

According to the method, a gross route or sketch of the route for the transport element is initially established. Typically, the gross route is defined by the designer, at least in part, and may be based upon various considerations as described hereinafter. According to the present invention, the gross route does not necessarily define a specific path along which the transport element will extend. Instead, the gross route consists essentially of path constraints that the eventual route of the transport element preferably satisfies. As such, the path constraints limit the possible routes for the transport element. However, the path constraints generally do not determine a unique route for the transport element and, in fact, may not fix precisely or uniquely the position of any portion of the transport element.

The gross route may be defined by a variety of constraints. For example, at least some of the constraints may be path constraints or extrinsic constraints related directly to the background structure. As graphically depicted in FIG. 14a, the starting point ctr, i.e., the A-end, and the ending point, i.e., the B-end, of the transport element are constraints and are typically defined by the background structure, such as the fitting to which the opposed ends of the transport element must connect. In addition to merely defining the location of the A-end and the B-end of the transport element, these path constraints may define the direction dir along which the transport element should be oriented proximate the A-end and the B-end. In addition, these path constraints may define an angular tolerance relative to the preferred direction to thereby define an allowable range about the preferred direction along which the transport element may approach the A-end or the B-end. Similar to the A-end and B-end, intermediate way points or hard points may be defined, such as in instances in which the transport element must be clamped at a specific position and with a specific orientation. As graphically depicted in FIG. 14b, the hard point may be defined not only in terms of location ctr, but the direction dir by which the transport element is to be oriented as the transport element approaches the hard point may be defined. An angular tolerance can also be associated with a hard point to define the acceptable angular deviation from the desired direction of the transport element as the transport element approaches the hard point. In addition, a spatial tolerance, typically defined in terms of a radius r, may be associated with the hard point to permit the transport element to pass anywhere within the finite radius of the hard point.

Another constraint is an adjustable hard point. The adjustable hard point defines a region of space through which the transport element must pass and within which a hard point, typically defined by a clamp must lie. In this regard, FIG. 14c depicts three different regions defined by respective adjustable hard points designated A, B and C. The transport element may pass anywhere within the region of space defined by the adjustable hard point and the hard point, i.e., $H_A$, $H_B$ and $H_C$, may be located anywhere within that same region. The method of the present invention may therefore not only automatically position the transport element to pass through the region defined by the adjustable hard point, but may also automatically position the clamp or other structure defining the hard point at any point within the region, preferably at a position that serves to more nearly optimize the resulting route of the transport element as described below. Several adjustable hard points may be placed in series with constraint relationships established between them. Constraint relationships are described hereinbelow and include such relationships as requiring adjacent adjustable hard points to be spaced apart by no more than a predetermined difference and/or to incur an increasing penalty or cost if the spacing between the adjacent adjustable hard points exceeds the predetermined difference. Additional penalties or costs may be associated with the adjustable hard points such as an increasing penalty or cost as the transport element and/or the location of the hard point approaches the boundary of the region. Thus, the method of the present invention may not only determine the most nearly optimal route for the transport element, but may simultaneously determine the locations for the hard points within the respective regions that optimize the resulting route of the transport element.

Figure 14A:
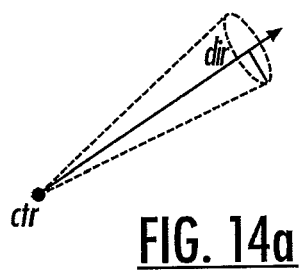
Figure 14B:
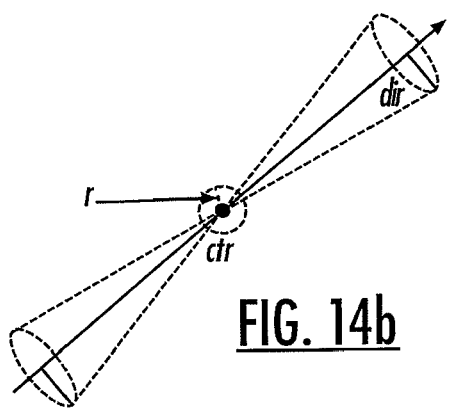
Figure 14D:
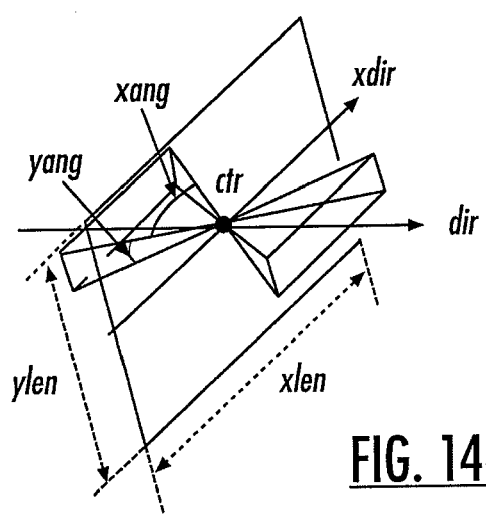
Figure 14C:
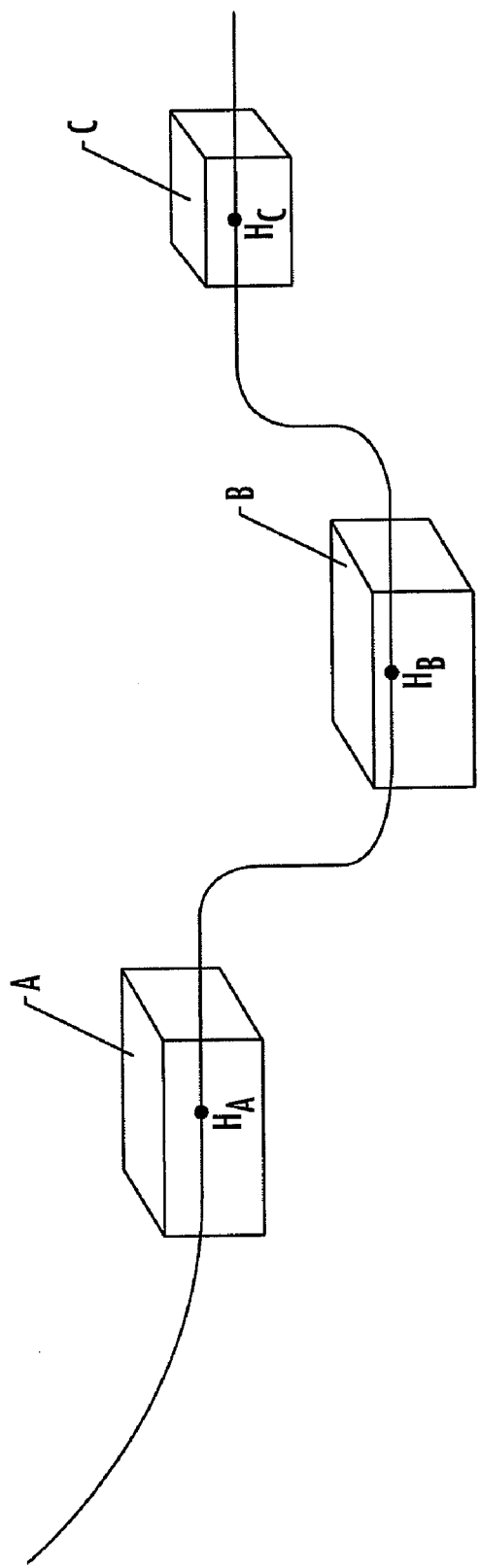

As another example, a through loop, such as a rectangular through loop, may be defined as depicted graphically in FIG. 14d. Typically, the rectangular through loop is defined in terms of the center ctr of the rectangle, a vector dir normal to the plane containing the rectangle, a vector xdir lying in the plane of the rectangle and the dimensions of the rectangle xlen and ylen. By utilizing a rectangular through loop, the transport element is permitted to pass anywhere within the bounds of the rectangle. In addition, an angular tolerance may be associated with the rectangular through loop to define the permissible angular deviation of the transport element from the normal vector. In this regard, one angular tolerance xang may be defined in the local x-direction as defined by the vector xdir and another angular tolerance yang may be defined in the local y-direction. While a rectangular through loop is depicted and described, the through loop may have other shapes, if desired. It should be noted that the final configuration of the transport element and, in particular, the point at which the transport element intersects the plane of the rectangle may be taken as the location of an actual clamp, bracket, hole or the like.

Figure 14E:
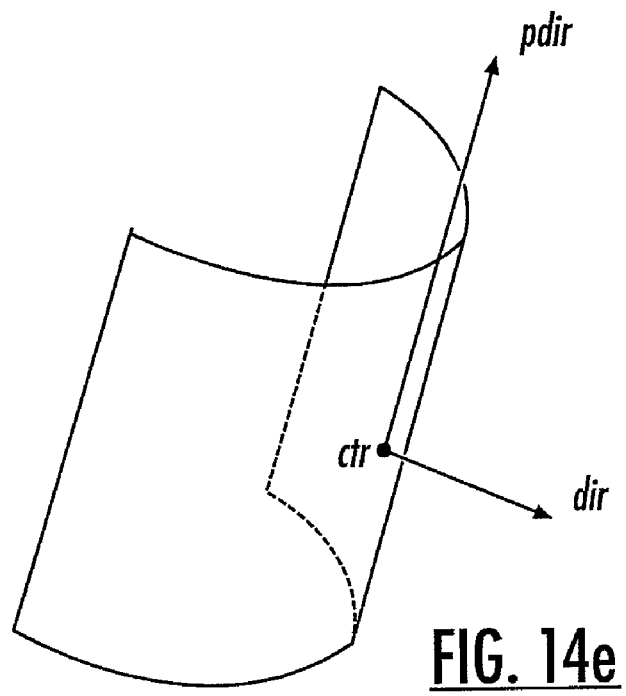

Another path constraint is a stay-away point which defines a sphere having a center and a radius through which the transport element may not pass. A less symmetric zone, such as a stay-out zone and more particularly a parabolic sheet stay-away zone, may also be defined as shown in FIG. 14e. The stay-out zone defines a region in space through which the transport element may not pass. In the illustrated embodiment, the parabolic sheet is typically defined in terms of the center ctr of the parabolic sheet and a vector dir extending normal to the parabolic sheet on the convex side of the parabolic sheet at the center of the parabolic sheet. In addition, a vector pdir perpendicular to the normal vector and also extending through the center point is defined. The asymmetric nature of the constraint forces the transport element to remain on one side or the other of the parabolic sheet stay-away zone. This gives the designer more specific influence than a sphere; it effectively allows the designer to block out more space.

Figure 14F:
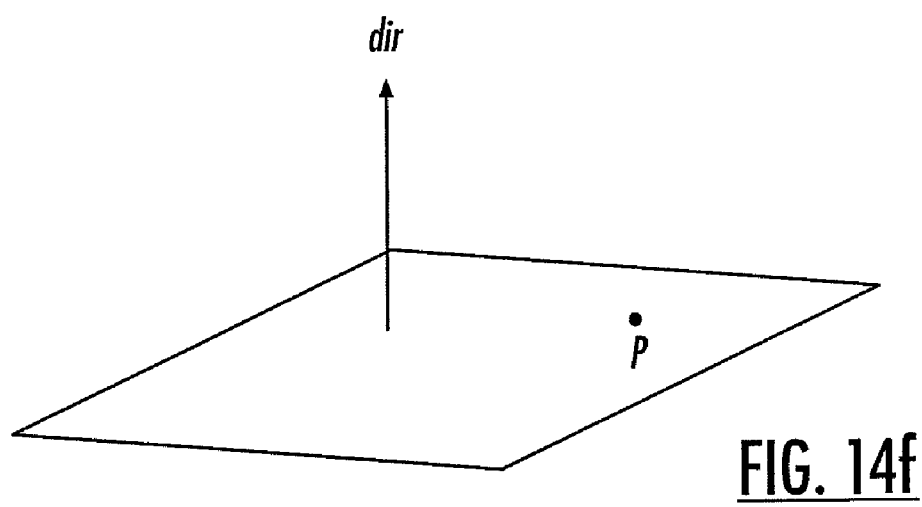

Another example of a path constraint is a stay-in plane constraint as shown in FIG. 14f which defines a plane in terms of any point p that lies within the plane and a vector dir normal to the plane. With respect to a stay-in plane constraint, a portion of the transport element must lie in the plane. Similarly, a stay-away plane constraint may be defined in terms of any point that lies within the plane and a vector normal to the plane. With respect to a stay-away plane, at least one portion of the transport element must lie on one side of the plane. While the foregoing examples illustrate the variety of path constraints, a number of other constraints may be established including boxes and rounded boxes to name a few. As such, the variety of path constraints is essentially arbitrarily extensible.

At least some of the above-described path constraints also require an offset or a standoff. An offset is the minimum length of a straight section of the transport element that must appear on one side of some path constraints, such as a hard point that may represent the mounting of a transport element to a clamp. In this regard, a straight section of transport element must extend outward from each side of the hard point. Analogously, for the A-end or the B-end, a standoff is defined as the straight section of the transport element that must extend outward from the A-end or the B-end prior to a bend in the transport element. As will be apparent, the offsets and standoffs permit, for example, tool access and fitting clearance.

As the foregoing examples demonstrate, at least some of the constraints may be inequality constraints. An inequality constraint limits the possible routes without fixing the position of any portion of the transport element. In this regard, inequality constraints do not specify that the transport element must coincide with a particular point, such as the A-end, the B-end or a hard point. Instead, an inequality constraint merely defines bounds within which the transport element may be routed. Examples of an inequality constraint include the rectangular through loop, a stay-out zone or any other type of path constraint that does not precisely fix the location or orientation of any portion of the transport element, but instead defines a region or range within which the transport element should lie. As exemplified by the through loop constraint, inequality constraints may define a limit such that the eventual route of the transport element will be constructed so as to be within the limit.

By way of an example, FIG. 15 depicts a collection of path constraints for a transport element that must be routed between two fittings. In this example, the A-end path constraint coincides with a fitting with which the starting end of the transport element must connect. The hard point path constraint is placed to coincide with a clamp that will engage the transport element. The rectangular through loop coincides with a region of a beam web in which it is permissible to drill a hole. The stay in plane path constraint coincides with the surface of a piece of equipment or other structure on which a clamp is mounted for connection to the transport element. In this regard, a stay-in plane path constraint, as opposed to a hard point path constraint, is utilized since it is known only that the clamp will be placed upon the surface of the equipment or other structure, but it is not known the exact location of the clamp. The stay-out zone path constraint effectively covers or shields a piece of equipment or another transport element which the transport element that is in the process of being routed may not approach more closely than some predefined distance. Finally, the B-end path constraint coincides with another fitting with which the ending end of the transport element must be connected. As will be apparent, the path constraints do not specifically define the route of the transport element, but do place limitations upon the eventual route of the transport element while abstracting and simplifying the background structure, thereby generally making the problem of routing the transport element in an optimized manner more mathematically tractable than if the background structure were treated in its full detail.

The constraints, such as those depicted in FIG. 15, define a set, typically an infinite set, of possible routes that are feasible in that each possible route complies with each of the constraints. In this regard, several different feasible routes are depicted in dashed lines in FIG. 16.

Path constraints typically give rise to a number of other low level or primitive constraints to be created. In other words, path constraints are bundles or macros comprising many low level constraints packaged together in generally very complex ways. In this regard, reference is made to FIG. 17 in which a transport element penetrates a through loop. As illustrated, the transport element intersects the plane defined by the rectangular through loop at point C, which is spaced from loop edge 1 by $d_1$, loop edge 2 by $d_2$, loop edge 3 by $d_3$ and loop edge 4 by $d_4$. In addition, the transport element intersects the plane defined by the through loop at an angle of xang relative to the normal vector measured in the local x-direction and an angle of yang from the normal vector measured in the local y-direction. Offsets of $O_U$ and $O_D$ are also defined between the point C at which the transport element intersects the plane defined by the through loop and the point $T_U$ at which the bend that is immediately upstream of the through loop becomes tangent to the straight section that penetrates the through loop and point $T_D$ at which the bend immediately downstream of the through loop becomes tangent to the straight section that penetrated the through loop, respectively. The upstream and downstream offsets $O_U$ and $O_D$, the distances between the point of intersection between the transport element and the plane defined by the through loop to each of the loop edges $d_1$, $d_2$, $d_3$ and $d_4$ and the angular offsets from the normal vector Xang and Yang are considered low level constraints that arise as a result of the imposition of the through loop path constraint.

By utilizing path constraints, the designer can effectively limit and simplify the amount of background structure which will have an influence upon the route of the transport element. Typically, the path constraints do not have the same degree of geometric complexity as does the background object, if any, stood for by the path constraint. However, the path constraint may mimic the shape of an object, or capture a salient feature of the object such as its general orientation, may determine other aspects of the trajectory of the transport element, such as a direction of the transport element, in the region of the object, and is well suited as a data structure to be considered during the determination of the optimal route of the transport element. It should be noted, however, that while path constraints can advantageously represent various objects of the background structure, the path constraints do not necessarily represent any real object, but can be inserted by the designer as the designer sees fit, such as based upon the designer's intuition about the proper routing of the transport element, even if the path constraint has no obvious basis in the background structure.

In addition to merely defining a number of independent path constraints, the method according to one aspect of the present invention permits relationships to be established between at least two of the path constraints. For example, it may be desirable for a transport element to penetrate a series of holes at the same angle and the same spatial offset so that the same style of bracket or clamp may be used at each hole to engage the transport element. While the designer will not care, at least within certain limits, about the actual values of the angle or offset, the designer will require that the angle and spatial offset be the same at all places. In marked contrast to merely selecting an angle and then requiring that the transport element penetrate each hole at the selected angle, the method of this aspect of the present invention permits the actual angle to be varied so long as the transport element penetrates each hole at the same angle and offset. As such, the value of the angle may be varied according to this aspect of the method in order to optimize the resulting route of the transport element.

In addition to the path constraints which may or may not, in a given instance, be based upon the background structure, but whose nature might lead them to be seen as intended to potentially model or directly reflect some aspect of the background structure, the method of the present invention may establish constraints that are not related in an obvious or straightforward geometric manner to the background structure. For example, a constraint may fix the slope of at least some segments of the transport element to a constant value or to be above or below a predetermined value. In addition, a constraint may fix at least some segments of the transport element to be planar in order to facilitate duplication of the routing of the transport element, since planar sections can generally be utilized on either the left or right side of an vehicle without modification.

Other constraints may be established that are intrinsic constraints that are not related at all to the background structure, but are, instead, dependent only upon the shape of the transport element itself and the corresponding limitations upon the shape of the transport element. In this regard, intrinsic constraints generally include constraints such as the minimum bend angle, the maximum bend angle, the minimum straight section length between bends, a constant bend radius and the like. As such, the intrinsic constraints usually take into account the limitations inherent in the manufacture or installation of a transport element that arise as a result of the manufacturing equipment or in the assemblability, as in the maximum curvature introduced into a hose or wire. Since the intrinsic constraints are dependent upon the type of transport element that is being routed, other types of transport elements may have other intrinsic constraints.

Each of the intrinsic constraints, such as the minimum bend angle, the maximum bend angle etc., as well as a number of the parameters associated with the path constraints based upon the background structure, such as offsets, standoffs, angular tolerance, etc., may be treated as either hard constraints or soft constraints. A hard constraint has an associated value, i.e., a not-to-exceed (NTE) value, that may not be exceeded during the design of the route of the transport element. For example, if a minimum bend angle serves as a hard constraint, the transport element may not be bent at an angle less than the minimum bend angle. As used herein and as exemplified by the minimum bend angle, the term exceed may imply either being larger than a preferred value or smaller than a preferred value depending upon the nature of the parameter. Alternatively, a soft constraint defines a preferred value and a progressively severe violation cost associated with the failure to design the route of the transport element such that the preferred value is met. Thus, if the minimum bend angle is a soft constraint, a preferred value for the minimum bend angle will be assigned. Although the transport element may be routed such that the transport element is bent at an angle less than the minimum bend angle, the transport element will still be considered feasible although a violation cost will be assigned to the non-preferred bend angle. The violation cost will, in turn, be considered during the process of selecting the optimal route for the transport element as described hereinbelow. It is noted that a soft constraint is by definition always satisfiable and, as such, if all constraints were soft then every configuration of the transport element would be feasible.

A number of constraints including interactions with path constraints such as offsets, distances from stay-out zones, etc. may be defined as hard constraints and/or soft constraints. In this regard, both NTE and preferred values may be assigned for each constraint. Thereafter, the designer has four different enforcement styles from which to choose. First, the designer could merely set a parameter to be a hard constraint at the NTE value, thereby ignoring the preferred value. Secondly, the designer could define the parameter to be a hard constraint at the preferred value. Further, the designer could treat the parameter as a hard constraint at the NTE value, while also treating the parameter as a soft constraint with violation costs being assigned for values of the parameter between the preferred value and the NTE value. In this instance, the parameter would preferably end up equal or close to the preferred value and, in no event, would exceed the NTE value. Lastly, the designer may treat the parameter only as a soft constraint at the preferred value.

Based upon the plurality of path constraints, the method of the present invention automatically defines a route for the transport element. In this regard, a route that complies with each of the hard constraints is preferably defined such that the route will be feasible. In addition, the route is preferably defined such that the route complies as closely as possible with the preferred values of the soft constraints. While a plurality of routes likely may be defined that are feasible, i.e., that comply with each of the hard constraints, the method of the present invention preferably selects, by means of an optimization procedure, a unique, optimal member from the plurality.

In order to permit the route to be optimized, a selection criterion, also known as an objective function, is preferably defined based upon one or more design characteristics or parameters of the route. Various selection criterion may be utilized depending upon the importance of the various parameters of the transport element design. In this regard, the length of the transport element is frequently a parameter that is desirably minimized. As such, the selection criterion may be the length of the transport element with shorter transport elements being regarded as more nearly optimal than longer transport elements. Another parameter that may be established as a selection criterion is the compliance of the transport element. Compliance is essentially the amount of give in a transport element and depends not only on the shape of the transport element, but on the type and arrangement of the fixtures into which the transport element will be installed. In this regard, the fixtures are often regarded, for convenience, as having zero compliance. Since transport elements cannot be manufactured without some error, and since the fixtures into which the transport element is installed are also imperfect, every transport element is installable only because it exhibits some compliance. Additionally, a transport element having a large degree of compliance will generally suffer lighter loads upon installation than a very stiff or non-compliant transport element. If the installation loads are too great, the transport element will generally be rejected at the shop floor, obviously a disadvantageous result since cost and time will already have been expended to manufacture the transport element and since the assembly process will have to be halted. As such, transport elements having a relatively high compliance are generally correlated with a low probability of rejection. In this regard, compliance is so important that designers otherwise often introduce expansion loops into transport elements for the express purpose of increasing the compliance of the transport element.

Another parameter that may be established as a selection criterion is the flow resistance of the transport element. In general terms, the more curvature that a transport element has, the greater the flow resistance of the transport element. While software programs are commercially available for computing the flow resistance of various transport element designs, the number of bends along the route of a transport element or a simple function of the integrated curvature as well as the length of the transport element may be utilized to approximate the flow resistance or head drop along the route of the transport element.

Regardless of the particular characteristic upon which the selection criterion is based, the contribution of each segment of the transport element to the overall characteristic or parameter upon which the selection criterion is based, such as the length, compliance, flow resistance or the like, may be summed or otherwise combined. Thereafter, the various feasible routes of the transport element may be compared and the route of the transport element which best satisfies the selection criterion, by having the shortest length, the greatest compliance or the least flow resistance, for example, will be selected as the optimal route for the transport element. While several parameters have been described to establish the selection criterion, these parameters are provided by means of an example since the selection criterion can be defined in terms of wide variety of other design characteristics, if so desired.

Instead of being based upon a single characteristic or parameter, the selection criterion may be simultaneously established and considered based upon a combination of multiple characteristics or parameters. In one embodiment, the contribution of each characteristic may be weighted with the characteristic that is most important being weighted more greatly than another characteristic that is less important in the designer's opinion. As such, the selection criterion or objective function defined by the weighted combination of the design characteristics for each feasible routing of the transport element would then be considered and the route of the transport element that best satisfies the weighted design characteristics collectively would be selected as the optimal route for the transport element.

The method of one embodiment of the present invention not only utilizes the selection criterion to identify the optimal route from among a plurality of feasible routes, but also as a constraint to limit the space or set of feasible routes. In this regard, a maximum length, a minimum compliance, a maximum flow resistance or the like may be defined and may serve as a hard constraint on the feasible routes of the transport element that may be constructed. From among the plurality of feasible routes that comply with this additional hard constraint, the selection criterion are then analyzed to determine the optimal route as described above.

The method of the present invention can also utilize other types of selection criterion. As described above, for example, preferred values can be assigned to various parameters. In this regard, preferred values can be assigned to one or more of the intrinsic constraints, such as the minimum bend angle, the minimum straight segment length, etc., as well as one or more of the design characteristics previously discussed, such as the length of the transport element, the flow resistance, the compliance of the transport element or the like. Additionally, a violation cost function for variances from the preferred value may also be defined. Although any violation cost function may be utilized, the violation cost function is typically a smoothly increasing function. As such, a selection criterion may be established based upon the cost of the variances from the preferred values of selected parameters or soft constraints. The route of the transport element having the lowest cost of variances will then generally be selected as the optimal route of the transport element. While the violation costs for variances from a preferred value of a soft constraint may be defined in various manners, one definition of a violation cost is described below:

$$\text{Violation Cost} = \begin{cases} 0, A \leq P \\ \left[\frac{A-P}{A-D}\right]^2, A > P \end{cases}$$

wherein A is the actual value of the parameter, D is the NTE value assigned to the parameter and P is the preferred value of the parameter. As mentioned above, other definitions of the violation cost may be utilized including smoothed staircase-shaped functions that may more accurately represent the discontinuous jumps in cost that occur, for example, when transitioning from one manufacturing process to another. For example, the violation cost associated with a bend that defines an angle less than the minimum bend angle may be based upon the cost of bending the tube without the cost being a constant c up to a 120°, 2c for a bend between 120°-170° since a different machine must be utilized to bend the tube, and 10c for a bend greater than 170° since the bending process must be performed manually.

The total violation cost for a given design characteristic may therefore be the sum of the violation costs along the route. For example, in instances in which the violation cost is the minimum bend angle, the violation cost, if any, for each bend may be summed to produce the total violation cost. The optimal route of the transport element is selected based upon the selection criterion which may combine the violation cost and one or more other design characteristics, typically in a weighted manner. The optimal route is therefore generally defined by minimizing the violation cost summed or otherwise combined with any other design characteristics that form a portion of the selection criterion. By doing so, the method may effectively drive all violations along the route of the transport element towards a weighted average value. Alternatively, the optimal route of the transport element may be selected to minimize the greatest violation. While this method would permit all violations to tend to a shared or common value that is slightly less than the maximum violation without further penalty, some designers may find this technique useful.

As described above, therefore, a plurality of different parameters or soft constraints may collectively be combined into the selection criterion. In this case, the contributions to the violation cost provided by each different soft constraint may be individually weighted based on the relative importance of violations of the respective soft constraint. The contributions of each soft constraint are then combined to determine the total violation cost.

As described above, after establishing the selection criterion, one or more routes are constructed and the optimal route is selected. It is noted that in some cases, there may be no unique optimal route. For example, two different routes may have the same length, the same bend angles, etc. and may differ only in their node spacing. In such cases, other costs may be combined into the selection criterion, such as a cost for unequal node spacing, in order to differentiate the routes.

The route of the transport element may be defined in various manners. As explained hereinbelow, the initial selection of the nodes in terms of the number of nodes and the ordering of the nodes with respect to the path constraints as well as the concomitant continuous optimization of the number and positions of the nodes can be formulated as a mixed integer problem and solved by a generic mixed integer solver. According to one embodiment to the present invention, however, the route is defined heuristically in a series of steps as follows:

(1) identifying an initial route that satisfies each of the path constraints, but that is not necessarily optimized and may not necessarily satisfy all of the intrinsic constraints, (2) identifying the nodes of this initial route that appear to be most significant or salient, and (3) constructing trial routes containing just the endpoints and then progressively readmitting the most significant or salient points from the initial route until a good route is found.

In order to define the initial route that satisfies each of the hard constraints, but is not necessarily optimized using the eventual selection criterion but is instead optimized for efficiency according to a simplified selection criterion such as length, and may not satisfy all of the intrinsic constraints, a number of nodes are identified and positioned relative to each path constraint such that the resulting route extending through the nodes satisfies the various path constraints, though not necessarily all of the intrinsic constraints. For example, it may be advantageous to relax the minimum bend angle constraint and the minimum straight section length constraint to insure that some feasible route is identified. In order to ensure that a feasible path is found, the initial route generally includes an over-estimate of the number of nodes, such as two or three nodes between any two path constraints. The number of nodes that define the initial route may be placed based upon the type of path constraints that lie along the route. For example, if a hard point is followed by another hard point, two nodes are generally placed between the two hard points. In addition, a number of extra nodes are generally inserted in the region of a stay out zone. However, the nodes that comprise the initial route may be placed in any of a wide variety of different manners so long as the hard constraints are satisfied with goal being to obtain quickly any route that goes through all the path constraints and reflects, in a gross sense, the likely final shape of the transport element. By way of example, FIG. 18 depicts a plurality of path constraints as well as the nodes and the resulting route that satisfies each of the path constraints.

The route is essentially relaxed, via a continuous optimization algorithm such as NPSOL, to a position that still conforms with the path constraints but is shorter as shown in FIG. 19. Thereafter, the nodes that are less important to the overall shape, such as the nodes at which the transport element bends only slightly, are identified and deleted. If the deletion of a node renders the resulting route of the transport element infeasible, the node is readmitted even though the node initially appeared to be of less importance. By way of example, the nodes along the route of the transport element depicted in FIG. 20 that are indicated with arrows, appear to be of less importance since the transport element bends only slightly at these nodes. By deleting each of these nodes, the route of the transport element then extends as shown in FIG. 21. By way of further example, a technique for identifying the less important nodes will be hereinafter described. The position of the remaining nodes of the route depicted in FIG. 21 are not necessarily optimal since the remaining nodes were positioned in the context of a route having a different set of nodes. In this regard, the measure of optimality of a route is seen to be dependent upon the number of nodes and their ordering relative to the path constraints. The route is therefore reoptimized continuously, such as by moving the nodes as necessary in order to decrease the overall length of the route while still complying with the various path constraints. An example of the further optimized route of the transport element is depicted in FIG. 22. Although the continuous optimization can be performed in various manners, many commercially available software programs such as NPSOL can perform the optimization.

The identification of the less important nodes may be performed in a variety of manners. By way of example, however, one embodiment of a heuristic method for identifying the less important nodes of a transport element route will be described hereinafter. In this regard, an initial route, such as depicted by FIG. 19 is originally constructed. The initial route is feasible in that the route satisfies each of the path constraints, but is not necessarily optimal with respect to the final, full selection criterion, does not necessarily satisfy all intrinsic constraints and is likely overpopulated with nodes. The initial route will be termed the original node list. A straight segment is then constructed through the first and last nodes of the original node list. In other words, a straight segment is constructed that extends between the A-end and the B-end of the initial route. The perpendicular deviation of each intermediate node of the original node list from the straight segment is then measured. A modified route is then constructed by readmitting the node whose deviation from the straight segment is the greatest. The original node list is considered as split at the readmitted node which is called a breakpoint, thereby creating two new node sublists.

For each node sublist, the perpendicular deviation for each intermediate node of the node sublist that is not yet included in the modified route is determined. In other words, for each node sublist, the deviation of the nodes that lie between the first and last, i.e., the endmost, nodes of the respective node sublist from the respective straight segment extending between the endmost nodes of the respective node sublist is determined. For each node sublist, the node having the greatest deviation is chosen as a breakpoint to be added to the modified route, thereby further subdividing the route and creating two new node sublists. This process is repeated for each of the newly created node sublists until each of the nodes of the original node list have been used as a breakpoint or an endpoint. As a result of this process, the deviation for each node at the time of its selection as a breakpoint is noted. This process is termed recursive subdivision.

In order to construct the optimal route of the transport element, a trial route is constructed that extends linearly between the first and last nodes, i.e., between the A-end and the B-end. An attempt is made to continuously optimize this route by means of NPSOL or the like, during which process a determination is made as to whether it is feasible, i.e., if it can satisfy each of the path constraints. If not, the node from the original node list having the greatest deviation, as determined above, is re-admitted to create a modified trial route. Following the re-admission of the node, an attempt is made to optimize continuously the modified trial route, such as by means of NPSOL or the like, during which process a determination is made as to whether the modified trial route is feasible relative to the path constraints. If not feasible, the process of re-admitting additional nodes is continued with the node having the greatest deviation as described above being re-admitted and attempts made to optimize the resulting trial route and, as a result, to determine if it is feasible. For a feasible route, the process of defining the route of the transport element could terminate.

Preferably, once feasibility is obtained, one or more additional nodes are admitted, however, to determine if the further modified route of the transport element is improved by the addition of one or more nodes. In this regard, a measure of the optimality of each feasible route is obtained based upon the selection criterion, also typically by means of a commercially available optimization program such as NPSOL, and is compared to determine if the optimality is improving. This measure of optimality may be identical to the selection criterion or objective function utilized during the continuous optimization, but generally may be different based upon the designer's preference. For example, it may include a function of the number of nodes, whereas the number of nodes is by definition a constant from the point of view of the continuous optimization process. This entire process of readmitting nodes is termed a forward pass. During the forward pass, an improvement threshold is typically established, such as 10%, such that if the measure of optimality of the further modified route exceeds the measure of optimality of the prior route by at least the improvement threshold, the process of further admitting additional nodes from the original node list and reoptimizing the resulting route is continued. If, however, the measure of optimality of the further modified and optimized route is not greater than the measure of optimality of the prior route by at least the improvement threshold or if the further modified route is infeasible, the process of further admitting additional nodes from the original node list is discontinued. In this instance, the prior route is also identified as the optimal route and the most recently admitted node is deleted to return to the prior route. As such, the process continues until the further modified route is either not feasible or is not a substantial improvement in terms of optimality relative to the prior route.

While the improvement threshold is generally greater than zero, the improvement threshold may be zero such that the process of admitting additional nodes continues so long as the further modified route makes even a slight improvement in optimality vis-a-vis the prior route. Additionally, while the embodiment of the method described heretofore terminates upon re-admitting an additional node from the original node list that makes the further modified route infeasible or that fails to improve the measure of optimality of the prior route by at least the improvement threshold, the method may be constructed to look ahead such that a predetermined number of nodes may be re-admitted following the determination that a further modified route is infeasible or failed to improve the measure of optimality of the prior route by at least the improvement threshold since there are instances in which although the re-admission of an additional node will cause the resulting route to be infeasible or to fail to improve the measure of optimality of the prior route by at least the improvement threshold, the addition of further nodes will not only make the resulting route feasible, but will significantly increase the measure optimality of the resulting route.

Once the most nearly optimal route is determined, the process may be discontinued. In one embodiment, however, the nodes of the resulting route are examined once more to ensure that each node is really necessary. In this regard, it is possible that a node having a relatively low deviation was re-admitted during the forward pass. For example, a node that is not strictly needed for feasibility may have a moderate deviation, while another node that is strictly needed for feasibility may have a very low deviation. As such, the node that is not strictly needed for feasibility will have been re-admitted prior to the node that is required for feasibility due to the relative deviations of the nodes. By way of example, an initial route that is feasible in that it satisfies the constraints at the A-end and the B-end as well as a hard point path constraint is depicted in FIG. 23. The route has five nodes numbered in order of decreasing salience or deviation, with node 1 having the greatest deviation and node 5 having the least deviation. In this regard, the dashed lines indicate the successive straight segments through the endpoints of respective sublists and the dotted lines indicate the deviations of the nodes from the respective straight segments. In this example, node 2 has a slightly greater deviation than node 3, even though node 2 is not strictly necessary for feasibility. After performing the forward sweep, a route as depicted in FIG. 24 is obtained.

Based upon the route generated by the forward sweep depicted in FIG. 24, the nodes are re-ranked in terms of deviation in a comparable manner to that described above in conjunction with the forward sweep. In this regard, a straight segment is constructed that extends from the A-end to the B-end. The node of the route constructed by the forward sweep that deviates most greatly from the straight segment is then identified as a breakpoint. The straight segment is then divided into two straight subsegments, each of which extend between respective endpoints. For each subsegment, a node sublist is created consisting of the endpoints and intermediate nodes lying therebetween. For each node sublist, the perpendicular deviation for each intermediate node from the respective straight subsegment is determined. In other words, for each node sublist, the deviation of the nodes that lie between the nodes defining the ends of the respective straight subsegment from the respective subsegment is determined. For each node sublist, the node having the greatest deviation is chosen to thereby further subdivide the respective straight segment into two additional subsegments, each of which has an associated node sublist. This process is repeated for each of the newly created node sublists until each of the nodes of the original node list have been re-admitted. As a result of this process, the deviation for each node at the time of its selection is noted. It is noted that the deviation of the nodes of the route constructed by the forward sweep will typically differ from the deviation of any comparable nodes of the initial route since the route constructed by the forward sweep will usually have fewer nodes and the nodes may be in somewhat different locations as a result of the optimization processes performed during the forward sweep.

Beginning with the node having the least deviance, the least deviant node is deleted. An attempt is then made to optimize the modified route, such as by means of NPSOL or the like, and, as a result, the feasibility of the modified route is determined. If the modified route is feasible, the relative optimality of the route is also determined. If the node is deleted and the resulting route remains feasible and the optimality does not significantly decrease, i.e., does not decrease by more than a predefined degradation threshold, the process, termed the reverse or backwards pass, continues by deleting the remaining node having the least deviance in the same manner as described above. As also described above, the measure of optimality against which the degradation threshold is applied might generally differ from that used or seen by the continuous optimization process.

If the route is infeasible or if the measure of optimality substantially decreases, such as by more than the predefined degradation threshold, however, this process may be halted and the node that was most recently deleted is re-admitted to define the modified route. Alternatively, the reverse pass may look ahead by deleting one or more additional nodes to determine if the resulting route again becomes feasible and if the measure of optimality of the resulting route increases or, at least, does not substantially decrease. If so, the reverse pass may continue until the route is again infeasible or the measure of optimality decreases by more than the degradation threshold and the further deletion of one or more additional nodes does not revive the optimality of the route or cause the measure of optimality of the resulting route to increase or at least not substantially decrease. Upon completing the reverse pass, the resulting route is not only feasible, but tends to have a small number of nodes, at least with respect to the original overpopulated centerline. An example of the modified route following the reverse pass is depicted in FIG. 25.

The method of the present invention generally produces an optimal route as well as a cost report identifying cost violations attributable to variations from the preferred values or the NTE values for various design characteristics or parameters. Based upon this information, the designer may vary the preferred values or may reweight the relative importance of variations from the preferred values and then re-execute the method in order to find another route. As such, the method permits a designer to readily experiment with the relative importance of different design characteristics so as to select the route that is not only feasible, but is most appropriate for the situation. It is noted that the re-execution of the method following adjustment of the weightings may be performed very quickly since it need not involve researching "node-space", i.e., repeating the forward/backward sweep(s). Additionally, the designer is able to address problems more directly by adjusting design characteristics that are conceptually very closely related to the specific problem. For example, in order to relieve a too small bend angle, the designer need not consider all of the indirect ways in which to effect the relief, such as lengthening a segment and shortening another segment. Instead, the designer need merely increase the weight associated with violations of the minimum angle requirement. Although not described above, the designer can also introduce additional nodes into the resulting route if the designer feels additional nodes are appropriate, such as for increasing compliance or the like. In fact, a whole class of path constraints are those that are explicitly forced by the designer to exist at certain locations or within certain regions. Thus, the designer can always exert an arbitrary degree of control over the placement of nodes, should they wish to override the placement made automatically, for example. By way of example, FIGS. 19-22 depict, in their upper right corner, a path constraint that forces a node to exist inside a certain sphere.

The optimization technique described above is a heuristic method for approaching what is in principle a mixed integer problem. However, the optimization problem including the initial selection of the nodes in terms of the number of nodes and the ordering of the nodes with respect to the path constraints as well as the concomitant continuous optimization of the number and positions of the nodes may be treated more generically as a mixed integer problem and solved by a mixed integer solver, such as CPLEX. Mixed integer problems are ones where some independent variables are integers and other are continuous. In this application, the integer variables describe the number of nodes and their general ordering with respect to the path constraints, and the continuous variables describe the exact spatial locations of the nodes.

Although general mixed-integer problems and their solutions are well known, a description of the application of a general mixed-integer problem to the design of a route of a transport element in accordance with the present invention is provided in conjunction with the class of curves appropriate for representing bent-metal tubes. These are once-differentiable curves consisting in alternating straight segments of positive length and circular arcuate segments of positive finite length. In other words, these curves are arc-splines, i.e., splines consisting in a sequence of circular arcs, with the feature that every other arc has an infinite radius, i.e., is straight, and the remaining arcs all have a common finite radius. However, as noted elsewhere, the method of the present invention may also be applied to other classes of curves, more or less complicated than this exemplary curve, such as cubic B-splines, etc.

A mixed-integer optimization problem is one in which some, but not all, of the decision variables, i.e., independent variables, may take on only integer values. The rest may take on arbitrary real values. As mentioned above, some generic packages for solving mixed-integer problems exist including the CPLEX package. It is noted that the heuristic method described above already solves a mixed-integer problem. However, the heuristic formulation described above is not directly amenable to solution by a generic package like CPLEX. The reason is that a generic mixed-integer solver must be fed a fixed list of decision variables, a fixed objective, and a fixed set of constraints. In contrast, the heuristic method described above works with integer variables that are effectively a very compact encoding of the number of bends and their ordering relative to the path constraints, such that for each point in that integer space the set of non-integer decision variables is different. That is, the heuristic method does not formulate the problem in terms of a fixed set of decision variables, objectives, or constraints.

In order to illustrate the manner in which the problem could be formulated in terms of fixed set of variables, consider a route that must extend from the A-end, through a pair of loops, through a way-point or hard point and to the B-end. To approach the problem as a general mixed-integer problem, one could postulate an overpopulation of nodes. Each node represents three continuous decision variables, the x, y, and z coordinates of the node. With the $i^{th}$ node, two sets of constraints $c_{i,a}$ and $c_{i,b}$ are associated. In this sense, a constraint is a function with associated upper and lower bounds. More particularly, $c_{i,a}$ is a constraint on all the continuous decision variables that requires the segment just before the $i^{th}$ node and the segment just after the $i^{th}$ node to be parallel. This could be, for example, one minus the inner product of the associated unit vectors, with upper and lower bounds zero. $c_{i,b}$ contains, among others, a constraint that forces any bend at the $i^{th}$ node to fall within the minimum and maximum bend angle constraints. This would be, for example, the cosine of the bend angle, with appropriate upper and lower bounds. This second set $c_{i,b}$ also generally contains many other constraints, such as those on offsets and other interactions with the external path constraints, i.e., loops, stay-out zones, hard-points, etc.

In addition there are integer decision variables that effectively turn the constraint sets $c_{i,a}$ and $c_{i,b}$ "on" or "off". That is, there are some artificial variables $\Phi_j$ that can take on only integer values, and are used as multipliers on the constraints $c_{i,a}$ and $c_{i,b}$. Thus the final constraints in the mixed-integer problem may generally be written (with the subscripts omitted for clarity) as follows:

$$\text{lower\_bound} \leq \Phi c \leq \text{upper\_bound}$$

Thus when the $\Phi$ multiplying a given c is zero, the c is "off", or trivially satisfied, and when the $\Phi$ multiplying a given c is 1, the c is "on", i.e., they become non-trivial. It should be noted that other formulations may be utilized without departing from the spirit and scope of the present invention. Furthermore the $\Phi$'s are subject to the constraints that $0 \leq \Phi_j \leq 1$, and no two $\Phi$'s can take on values that would imply that a given node were both a bend and a non-bend simultaneously. That is, if there is a constraint that a given node must have parallel segments on either side of it, then there cannot also be a constraint that the given node must represent a bend of a certain minimum angle. Otherwise there would be a geometric contradiction.

In formulating the general mixed-integer problem, it should be taken into account that when there are multiple bends "turned off" in a row, the correct minimum straight-segment length requirement to apply cannot be established by simply applying a minimum straight-segment length constraint to each segment. Rather, the contiguous set of collinear straight segments, comprising all those between, and at the ends of, the contiguous non-bends, must be considered to be a single "super-straight" segment.

Heretofore, the general mixed-integer problem has been discussed only in conjunction with the constraints. However, a similar process must be followed to account for the objective function's dependence on parameters associated with bends.

With such a formulation, a generic mixed-integer solver as known to those skilled in the art could be set to work on the problem. It would essentially try out many different combinations of bends and their placement relative to the constraints, by trying out many different settings of the $\Phi$'s, subject to the constraints placed on them. At each setting of the $\Phi$'s it would have a continuous sub-problem to solve, at least partially. As a result of this process, however, the generic mixed-integer solver, such as CPLEX, would return the route that is most nearly optimal subject to the various constraints imposed upon the route and the selection criterion defined by the designer.

It should be noted that the routing problem solved by the method and computer program product of the present invention cannot be formulated as an optimization in all continuous variables. In this regard, it may be thought that an overpopulation of nodes may be introduced with some of them vanishing as a natural consequence of a continuous optimization process. Thus some nodes might coalesce, to effectively reduce the number of bends in a certain region, or other nodes might take on a zero-degree bend, also to effectively reduce the number of bends. However, such an approach is impossible in any continuous context, because of the intrinsic constraints such as minimum bend angle (which forbids any bend from continuously passing from a finite angle to zero angle) and the minimum straight segment length constraint (which forbids any two nodes from coalescing). Thus, for at least some classes of curves, there is inherently an integer aspect to the problem, namely to choose the number of bends and their ordering relative to the path constraints (both of which are described in only integer terms).

Oftentimes, it is desirable to route a new transport element parallel to or approximately parallel to an existing transport element. Various techniques can be employed in order to route a new transport element approximately parallel to an existing transport element. For example, a stay-in plane path constraint may be defined that includes at least a portion of the existing transport element such that the new transport element will be required to lie in the same plane as the existing transport element. In addition, a stay-away plane may be defined for each segment of the existing transport element. In addition, the distance between the existing transport element and the new transport element may be utilized as a component of a selection criterion with smaller distances being considered better than longer distances. As such, this selection criterion will tend to force the new transport element to approach the existing transport element as closely as possible, while the stay-away plane will prevent the new transport element from approaching the existing transport element any closer than the offset between the stay-away plane and the respective segment of the existing transport element.

According to an alternative method for routing a new transport element proximate to an existing transport element, a space may be defined through which the route of the new transport element will extend based at least in part upon the route of the existing transport element. Typically the space is sized such that a plurality of candidate routes may extend therethrough with the method of the present invention permitting the selection of an optimal route from among the plurality of candidate routes. As shown in FIG. 26, the method of this embodiment typically defines a sleeve, such as an annular sleeve, about each segment of the existing transport element. In this regard, each sleeve generally defines an opening through which a segment of the existing transport element extends as well as an annular region surrounding the respective segment of the existing transport element through which a segment of the new transport element may extend. In the example depicted in FIG. 26, each sleeve has a radius of $r_1$ requiring that the new transport element stay away from the existing transport element by at least a distance $r_1$. Moreover, the outside radius of each sleeve is $r_2$, thereby requiring the new transport element to remain within a distance of $r_2$ from the existing transport element. However, the sleeve may be defined in a number of other fashions without departing from the spirit and scope of the present invention.

By extending through the spaces defined by the sleeves, the new transport element is roughly parallel to the existing transport element. Although not shown in FIG. 26, a stay-in plane path constraint is also typically imposed to force at least a portion of the new transport element to lie in the same plane as at least a portion of the existing transport element, at least in certain sections as where clamps might be placed. Further, while FIG. 26 illustrates a single new transport element being routed roughly parallel to an existing transport element, an entire bundle of transport elements may be routed in a similar fashion if so desired. Thus, the method described above and depicted in FIG. 26 is advantageous since a new transport element may be routed in a manner that is roughly parallel to an existing transport element while permitting the new transport element to have a different number and arrangement of nodes. However, by not requiring the new transport element to be exactly parallel to the existing transport element, a more optimal route for the new transport element may be selected and greater freedom for the designer is retained.

Although the method has been described in conjunction with the routing of a single transport element, the method may route multiple transport elements simultaneously, as in a bundle. The multiple transport elements may be routed in various manners. For example, inter-transport element constraints may be defined to describe the desired relationships between the transport elements, as shown figuratively by the double headed arrows between adjacent transport elements in FIG. 27. It should be noted that the nodes of all of the transport elements are allowed to vary simultaneously, in contrast to prior techniques in which a model transport element was frozen in place while another transport element was routed alongside. Alternatively, a meta-transport element may be routed which has a shape, a shown in FIG. 28, sufficient to contain a plurality of transport elements.

The method of the present invention is typically performed by a computer program product that interacts with a designer to provide the functionality described hereinabove. The computer program product for performing the optimized routing of a transport element generally includes a computer-readable storage medium, such as the non-volatile storage medium, and computer-readable program code portions, such as a series of computer instructions, embodied in the computer-readable storage medium. The computer-readable storage medium is generally accessible by a processing element, such as a computer, workstation or the like, for executing the foregoing method in an automated fashion. Thus, based upon some input provided by the designer such as the path constraints, the identification of the selection criterion, the NTE and preferred values for various parameters, the high and low values for various parameters, the weighting of different cost violations and the like, the computer program product will then operate in accordance with the method of the present invention to determine an optimal route.

The method described above can therefore be implemented by computer program instructions. These computer program instructions may be loaded onto a computer or other programmable apparatus to produce a machine, such that the instructions which execute on the computer or other programmable apparatus create means for implementing the various functions of the method. These computer program instructions may also be stored in a computer-readable memory that can direct a computer or other programmable apparatus to function in a particular manner, such that the instructions stored in the computer-readable memory produce an article of manufacture including instruction means which implement the various functions of the method. The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the various functions of the method.

As described above, the computer program product is preferably adapted to solve a mixed-integer nonlinear optimization problem. The problem could be formulated in its full generality, and a commercial mixed-integer solver such as CPLEX could be utilized. In one embodiment, however, the method exploits specialized domain knowledge to generate a highly promising subset of points in the integer subspace, in a very efficient order. At each integer point it forms the minimally complex continuous subproblem and solves it completely if possible, i.e., if feasible. In another embodiment, not all continuous subproblems are solved completely, but are some are instead solved partially.

Each continuous subproblem corresponds to a particular number and placement of bends, that is, a choice of (a) how many bends there are, and (b) where the bends fall with respect to the path constraints and, more precisely, with respect to the targets. In this regard, one class of path constraints is targets. A target has the property that it necessarily exerts an influence on a predetermined number of nodes in the transport element. That is, the constraint formulas behind a target involve a predictable number of nodes. For example, a hardpoint sets up low-level mathematical constraints that involve precisely four nodes. Another property of targets is that the transport element can meaningfully be said to go through them.

Another class of path constraints is section constraints, which are different from targets in that the number of nodes they influence or constrain depends on the particular problem in which they are used. The reason they are called section constraints is that they apply to a section, the portion of a transport element lying between two targets. For example, a stayout zone may apply to the section consisting of the A-end, the B-end, and everything in between, i.e. the entire transport element. It is therefore impossible to initially determine the number of nodes in the section. Instead, the problem must be solved to determine the number of nodes. But however many there are, the stayout zone interacts with every node and link between the A-end and the B-end. If there was a hardpoint between the A-end and B-end, however, the same stayout zone could have been specified to apply to the section consisting in the A-end, the hardpoint, and everything in between. The stayout zone would not exert an influence on any nodes between the hardpoint and the B-end. It should be noted that a stayout zone, or any other section constraint, has a distinct identity independent of what section of the transport element to which it is applied, such that the same data structure can be re-used on different sections, or even different transport elements.

Finally, constraint relationships are meta-constraints that apply to conditions existing at any set of targets. Usually the set is just a pair, and larger sets are obtained de facto by chaining pairs together. In addition, constraint relationships may exist even between section constraints, not just between targets. For example, a constraint relationship may fix the slope in two different sections of the transport element to be identical, or identical to within certain limits, without specifying the slope in either section.

For each inter-target gap, a concrete number of bends must be assigned, and each distinct assignment leads to a new continuous subproblem, which consists in adjusting the node locations until the overall objective function, i.e., selection criterion, appears to be minimized.

It is illuminating to estimate the size of the integer space. If there are $N_t$ targets, then there are $N_t-1$ inter-target gaps. Assuming zero to three bends in any gap, then there are potentially $4^{N_t-1}$ points in the integer subspace to consider. Thus a 7-target problem implies 4096 continuous subproblems. Rather than visiting all 4096 integer sites, the method of the present invention instead visits a heuristically limited subset of them, typically a few dozen at most. Furthermore, these sites are advantageously visited in a particularly promising order, as in the forward and backward sweeps.

At any rate, each continuous subproblem has a complicated objective function and a complicated set of constraints. Complicated does not necessarily mean that variables or constraints are particularly numerous. In fact, by continuous optimization standards, they are rather few, on the order of dozens, or at most hundreds. It does mean, however, that the objective function and constraints depend in a complicated way on the path constraints which are set up by the designer in generally unpredictable ways, and generally in an interactive setting.

The path constraints are essentially bundles or packages of many primitive, low-level constraints that may be processed by commercial optimization programs such as NPSOL. The designer can pick and choose as many of these packages as they like, and lay them out in a 3-D environment. However, without computer assistance, to proceed from such a layout to a single complete, correct continuous subproblem, described directly in terms acceptable by commercial optimization programs would be time consuming.

That being said, the method of one advantageous embodiment performs two subtasks:

1. Transcription

Given an abstract description of a single continuous subproblem, i.e., given a choice of how many nodal points there are, and where they fall relative to the path constraints, the method constructs an appropriate objective function, a constraint function vector, the constraint bounds, scale factors, and other arguments, to pass to a commercial optimization program, which typically expects its inputs in this new form.

The difficulty in performing this transcription arises mainly from four causes:

i. Index Alignment: First, commercial optimization programs often require the various elements of an optimization problem to be arranged according to a tedious pattern termed index alignment. Index alignment means, for example, that if a certain function $C_O$ acts as the i-th constraint, then the upper and lower bounds applied to $C_O$ must occupy the i-th slots of a lower-bounds vector and upper-bounds vector, respectively. Keeping track of the index i is an error-prone task.

The computer program product of the present invention permits constraint or objective objects to be created, which can operate in an abstract namespace. Each object bundles a function, its bounds, and other information described below into a package that may be manipulated inside the program in any way. Each object's function will automatically share the same index as its bounds when presented to a commercial optimization program.

ii. Lack of an abstract namespace: Commercial optimization programs require that a given constraint or objective function be written to accept an array of independent variables, i.e., X_1 ..., X_N. It is the designer's responsibility to manage the mapping between conceptual variables, such as velocity, temperature, etc., and the sequentially ordered slots of $X\_1, \ldots X\_N$. This can make formulating a new optimization problem on the fly very difficult since formulating an optimization problem on the fly means adding not only new constraints and objective components, but perhaps adding new independent variables to the problem. For example, suppose a problem is created, on the fly, whose abstract building sequence is the following:

I. Introduce the independent variables x,y,z with objective function $f\_1(x,y,z)$ and impose the constraint $LB\_i <= g\_i(x,y) <= UB\_i$.

II. Introduce the independent variables u,v,w, and impose the constraint $LB\_j <= g\_j(v,w) <= UB\_j$.

III. Introduce the independent variables r and s, and impose the constraint $LB\_k <= g\_k(z,u,r,s) <= UB\_k$.

IV. Add to the objective function a new component $f\_2(s,z,x)$.

In practice, however, the designer would have to work in terms of the independent variable names provided by commercial optimization programs, i.e., $X\_1, \ldots X\_N$. The above steps would look like this:

I'. Introduce the independent variables x,y,z, but use $X\_1$ to store x, $X\_2$ to store y, and $X\_3$ to store z, and introduce an objective function $f\_1(X\_1, \ldots X\_N)$, which "knows" that $x=X\_1$, $y=X\_2$, and $z=X\_3$. Impose a constraint $LB\_1 <= g\_i(X\_1, \ldots, X\_N) <= UB\_i$, which "knows" that $x=X\_1$ and $y=X\_2$.

II'. Introduce the independent variables u,v,w, but use $X\_4$ to store u, $X\_5$ to store v, and $X\_6$ to store w, and impose a constraint $LB\_j <= g\_j(v,w) <= UB\_j$, but with the program written to accept arguments $g\_j(X\_1, \ldots X\_N)$ with the program "knowing" that $v=X\_5$ and $w=X\_6$.

III'. Introduce the independent variables r and s, but use $X\_7$ to store r and $X\_8$ to store s, and impose the constraint $LB\_k <= g\_k(z,u,r,s) <= UB\_k$, but with the program written to accept arguments $g\_k(X\_1, \ldots, X\_N)$ and the program "knowing" that $z=X\_3$, $u=X\_4$, $r=X\_7$, $s=X\_8$.

IV'. Add to the objective function a new component $f\_2(s,z,x)$, but with the program written to accept arguments $f\_2(X1, \ldots, XN)$; and the program "knowing" that $s=X\_8$, $z=X\_3$, and $x=X\_1$.

Obviously, with the latter scheme it can be very tedious and error-prone task to write one constraint and objective in terms of the single, crude namespace provided $(X\_1, \ldots, X\_N)$ because each function must be translated from $X\_1, \ldots, X\_N$ to the real variable names, in terms of which the real problem is conceived. The computer program product handles this translation automatically and efficiently and allows the designer to deal directly with the real variable names.

iii. Environments or Closures: The objects in (i) can be constraint functions or objective function components. A constraint function or objective component function is generally represented by a segment of compiled code, i.e., a subroutine. For example, in one embodiment of the present invention, there is a subroutine that can calculate the offset distance of a bend tangent from a hardpoint, given parameters consisting in: the location of the hardpoint center, the hardpoint orientation, the locations of the two immediate upstream nodes, the locations of the two immediate downstream nodes, and the bend radius. The node locations are generally independent variables in the optimization, i.e., they are adjusted by the optimization algorithm. The other parameters are constant in a given problem, however, and it is really these that we are calling the environment. The subroutine must have access to all these parameters in order to calculate a meaningful result. The constant parameters might be termed an environment or a closure, without which the subroutine has no well-defined meaning at the time the optimization algorithm evaluates it.

That being said, the computer program product essentially calls to a commercial optimization program, passing in an agglomeration of many such subroutines, some bundled together in, for example, a weighted-summation loop to act as the objective, others bundled together in an array to act as the set of constraints, but each one accompanied by the environment that imbues it with the right meaning for the given subproblem.

2. Flexible Manipulation of a Family of Subproblems.

The computer program product also makes it possible to formulate the myriad continuous subproblems that must be formulated and solved to account for the integer portion of the problem space.

To illustrate this feature, consider AT&T Mathematical Programming Language (AMPL) developed at Bell Labs. AMPL is a programming language which permits an optimization problem to be written down in a notation that is almost exactly like that found in a math text. AMPL distills the notation down to a single objective function and an array of constraint functions, along with their associated upper and lower bounds, etc., in precisely the form expected by a commercial optimization program, and then calls a commercial optimization program. Thus AMPL takes care of all the indexing problems, and provides an abstract namespace.

An AMPL program is closure in that the entire program is written, compiled and run. The computer program product may similarly have been constructed as a "meta-program" which determined the sequence of continuous subproblems that needed to be solved, and for each one, automatically wrote, compiled and executed an appropriate AMPL program.

However, the computer program product of the present invention builds up, and solves, a whole family of continuous subproblems in a very systematic way based upon a library of subprograms written in a conventional language such as C, or Fortran, or VB, or C++ without resorting to a special language or compiler.

The flavor of a program of this type is that from a conventional programming language, such as VB, library functions are called as follows in only figurative, greatly simplified pseudo-code:

$$\text{opt\_prob\_A*make\_new\_optimization\_problem()} \quad (1)$$

$$\text{create\_independent\_variable(opt\_prob\_A, "x")}$$

$$\text{create\_independent\_variable(opt\_prob\_A, "y")}$$

$$\text{create\_independent\_variable(opt\_prob\_A, "z")}$$

$$\text{impose\_constraint\_on\_variables(opt\_prob\_A, x,y,z,} \\ \text{constraint\_coefficients)}$$

$$\text{define\_objective\_function(opt\_prob\_A, x,y,z, constraint\_coefficients) etc.} \quad (1)$$

As supported by the EZmod program, this concept is termed event based optimization, because it allows a problem to be built incrementally in response to events such as mouse-clicks. In the present case, an event might be the designer declaring, with the mouse, that a certain piece of equipment should be surrounded by a stayout zone. Such an event initiates a certain set of "make_constraint" library calls, and a certain set of "define_objective" library calls, analogous to those depicted immediately above. Upon completion, there exists in memory a set of objects whose structure essentially mirrors the mathematical notation describing an optimization problem, i.e., it could be regarded as mirroring an AMPL program.

In contrast to the EZmod program, the computer program product permits the classes of objectives and constraints that are constructed to be defined by an arbitrary function, not just linear or quadratic function. Additionally, independent variables may be added on the fly since during the course of building up a problem interactively or incrementally, the number of variables may not be known until after the basic data structures have been created. In the computer program product, the basic data structure is an "optimization problem", such as "opt_prob_A", to which constraint functions and an objective function will be attached interactively. As such, it would be overly restrictive if the problem-object had to be created or declared with a fixed number of variables. That would make extremely inconvenient, for example, the introduction, on the fly, of the artificial variables needed to solve minimax problems, or the artificial variables needed to represent the adjustable hardpoint constraints.

The computer program product permits, however, the addition of a completely general constraint or objective. Rather than just make a call like impose_constraint_on_variables(opt_prob_A, x,y,z, constraint_coefficients)     (2)

where the constraint that is imposed is either linear or quadratic, and the constant coefficients are being supplied, a call is made as follows:

impose_constraint_on_variables(opt_prob_A, x,y,z, func, env)     (3)

where func is an arbitrary subroutine and env is the environment that the subroutine must run.

Thus, the computer program product allows multiple objective components to be added on the fly with the implicit rule that they are combined at run-time according to some rule, such as summation, to create a single objective.

In the pseudo-code example above, the function object func must be callable by the commercial optimization program. Thus, the designer must make the function conform to a style that the commercial optimization program can call. The canonical object-oriented way to do this is through inheritance in that a superclass or abstract class is defined that the commercial optimization program is enabled to call and the specific program functions for the given problem inherit from that superclass. In UML notation, the computer program product provides the following superclasses:

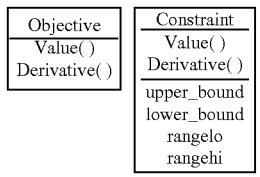

The only real difference between them is that the constraint has more information attached to it, like upper and lower bounds, and the expected upper and lower ranges of the variable over the duration of the optimization.

The user inherits from these problem specific user classes shown below with arrows extending from them:

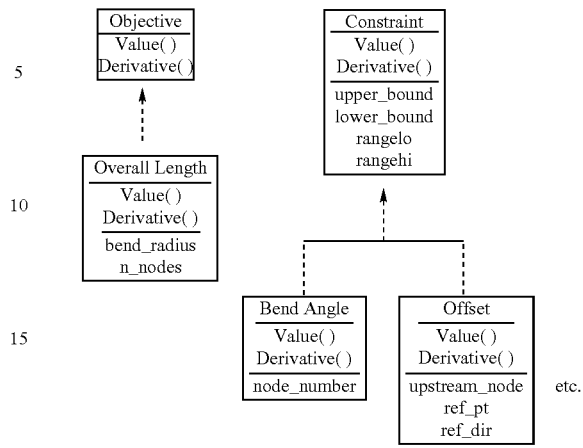

When a designer injects a path constraint, like a hardpoint, that path constraint knows which primitive constraints and objectives it should give rise to, so it constructs a number of object instances like those set forth above in conjunction with a bend angle (node_number) or an offset (upstream_node, ref_pt, ref_dir), and sets the attributes of each one so as to reflect the current continuous optimization subproblem. This setting of attributes may be regard as populating the respective function's environment or completing its closure. For example, suppose the highest-level of computer program product decides in the forward-sweep procedure that it is going to try five nodes laid out in a certain order with respect to three path constraints, and suppose that the three path constraints are an A-end, a hardpoint, and a B-end. The computer program product "tells" the hardpoint how many nodal points will be placed between the A-end and the hardpoint. That effectively tells the hardpoint which nodes it is concerned with, say, N2 and N3, among generally others since a hardpoint actually affects four nodes. Then the hardpoint would create an offset constraint whose upstream_node attribute would be N3.

It is commonly known in the field of numerical optimization to scale the variables so that they tend to vary between– and 1. A commonly used equation for scaling a parameter $x_i$ into a new quantity $y_i$ is:

$$y_i = \frac{2x_i}{b_i - a_i} - \frac{a_i + b_i}{b_i - a_i}$$

wherein $a_i$ and $b_i$ are anticipated minimum and maximum values, respectively, for the respective parameter. The method and computer program product of the present invention preferably perform this scaling on behalf of the user so that the designer does not have to modify the software programs that implement the objective and constraint functions. Furthermore, should a user desire to create an objective function component of the minimax type, i.e., the minimum of the maximum of the set of objective function components, the method and computer program product of the present invention can also facilitate such a constraint by introducing an appropriate alternative variable.

Regardless of the particular implementation, the various embodiments of the method of the present invention permit the route of a transport element to be automatically defined in accordance with one or more constraints that drive or guide the design. As such, the constraints are taken into account during the design of the route and do not merely serve as post hoc checks, wherein the discovery of any violations would require the route to be redesigned. Additionally, the method for designing the route of a transport element establishes a selection criterion to permit the route that is automatically defined to be optimal relative to the selection criterion. By establishing different types of selection criterion, different routes may be defined based upon the requirements of a particular application. Additional embodiments of the present invention further improve the method by permitting relationships to be established between two or more of the constraints and permitting the route to be automatically defined while maintaining the other constraints. Additionally, the route of the transport element may be based upon and proximate to a model transport element, if desired, or it may be applied to multiple transport elements simultaneously to route bundles.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. In this regard, the method of the present invention has been primarily described in conjunction with the routing of tubes. However, the method is also applicable to the routing of other transport elements such as cables, hoses, wires, wire bundles and the like. In addition, while the routes described heretofore have primarily consisted of straight segments connected by circular arcs, the method of the present invention may construct routes having other shapes, such as routes following a B-spline curve or the like. Although specific terms are employed herein, they are used in a generic and descriptive sense only and not for purposes of limitation.

What is claimed is:

1. A method of designing a route for a transport element comprising:
    establishing at least one constraint that limits possible routes for the transport element, wherein establishing the at least one constraint comprises establishing at least one inequality constraint which limits the possible routes for the transport element without fixing a position of any portion of the transport element, and wherein establishing the at least one constraint further comprises establishing at least one hard point constraint defining a location of a hard point through which the transport element must pass;
    establishing a selection criterion for evaluating the possible routes for the transport element, wherein each route for the transport element is defined by a plurality of parameters, wherein establishing the selection criterion comprises:
        defining a preferred value for each parameter and a violation cost function defining a cost for variances from the preferred value; and
        defining the selection criterion to be based upon a weighted combination of the cost for variances from the preferred value for each parameter;
    automatically defining the route for the transport element in accordance with the at least one constraint and pursuant to the selection criterion, wherein automatically defining the route comprises defining the route for the transport element to include straight segments that are non-orthogonal relative to one another; and
    providing the route for the transport element to a user.

2. A method according to claim 1 wherein establishing the at least one constraint further comprises establishing at least one path constraint based upon background structure.

3. A method according to claim 1 wherein establishing the at least one constraint comprises establishing at least one path constraint selected by a designer and capable of being independent of background structure.

4. A method according to claim 1 wherein establishing the at least one constraint further comprises establishing at least one intrinsic constraint dependent upon the transport element itself and independent of background structure.

5. A method according to claim 1 wherein establishing the selection criterion comprises defining the selection criterion pursuant to at least one predefined design characteristic.

6. A method according to claim 1 wherein automatically defining the route comprises automatically defining a plurality of nodes along the route.

7. A method according to claim 1 wherein establishing at least one hard point constraint comprises establishing at least one adjustable hard point constraint defining a region within which a hard point is located and through which the transport element must pass.

8. A method according to claim 7 wherein automatically defining the route comprises automatically defining the location of the hard point within the at least one adjustable hard point constraint.

9. A method according to claim 1 wherein establishing at least one path constraint comprises establishing a first plane containing at least a portion of a model transport element in which the route must remain and establishing second planes extending parallel to respective segments of the model transport element and perpendicular to the first plane which limit the proximity of the route to the respective segments of the model transport element, and wherein establishing selection criterion comprises establishing a spacing of each segment of the transport element from the second plane associated with the respective segment of the model transport element to be a selection criterion.

10. A method according to claim 1 wherein automatically defining the route comprises simultaneously defining respective routes for a plurality of transport elements.

11. A method of designing a route for a transport element comprising:
    establishing a plurality of constraints that limit possible routes for the transport element;
    in addition to establishing the plurality of constraints, establishing a relationship between at least two of the constraints that differs from the respective constraints;
    establishing a selection criterion for evaluating the possible routes for the transport element, wherein each route for the transport element is defined by a plurality of parameters, wherein establishing the selection criterion comprises:
        defining a preferred value for each parameter and a violation cost function
        defining a cost for variances from the preferred value; and
        defining the selection criterion to be based upon a weighted combination of the cost for variances from the preferred value for each parameter;
    automatically defining the route for the transport element such that the route separately satisfies the plurality of constraints and also satisfies the relationship between at least two of the constraints; and
    providing the route for the transport element pursuant to the selection criterion to a user.

12. A method according to claim 11 wherein establishing the at least one constraint further comprises establishing the at least one path constraint based upon background structure.

13. A method according to claim 11 wherein establishing the at least one constraint comprises establishing at least one path constraint selected by a designer and capable of being independent of background structure.

14. A method according to claim 11 wherein establishing the at least one constraint further comprises establishing at least one intrinsic constraint based upon the transport element itself and independent of background structure.

15. A method according to claim 11 wherein automatically defining the route comprises automatically defining a plurality of nodes along the route.

16. A method according to claim 11 wherein automatically defining the route comprises simultaneously defining respective routes for a plurality of transport elements.

17. A method according to claim 11 wherein establishing the plurality of constraints comprises establishing at least one adjustable hard point constraint defining a region within which a hard point is located and through which the transport element must pass.

18. A method according to claim 17 wherein automatically defining the route comprises automatically defining the location of the hard point within the at least one adjustable hard point constraint.

19. A method of designing a route for a transport element between a pair of endpoints comprising:
    establishing at least one constraint that limits possible routes for the transport element;
    constructing an initial route for the transport element having at least one node and satisfying each constraint;
    establishing a trial route extending between the pair of endpoints;
    modifying the trial route by adding at least one node from the initial route to the trial route until a feasible route that extends between the pair of endpoints satisfies each constraint is constructed; and
    providing the feasible route for the transport element to a user.

20. A method according to claim 19 wherein the trial route comprises at lest one segment extending between a pair of nodes, wherein the method further comprises determining, for each segment of the trial route, a deviation between each node of the initial route that lies between the pair of nodes defining the respective segment of the trial route and the respective segment of the trial route, and wherein adding the at least one node from the initial route to the trial route comprises adding nodes from the initial route to the trial route based upon the deviation of the respective nodes beginning with the node having the largest deviation.

21. A method according to claim 20 further comprising determining if the modified trial route is feasible following the addition of each node from the initial route.

22. A method according to claim 21 further comprising:
    optimizing the modified trial route if the modified trial route is feasible;
    obtaining a measure of the optimality of the modified trial route following the optimization;
    adding at least one more node from the initial route to the trial route following a determination that the modified trial route is feasible; and
    obtaining a measure of the optimality of the further modified trial route following the addition of at least one more node and the optimization of the further modified trial route.

23. A method according to claim 22 further comprising:
    defining an improvement threshold; and
    continuing the addition of at least one more node from the initial route to the trial route and the subsequent optimization and measurement of the optimality of the further modified trial route so long as the measurement of the optimality of the further modified trial route exceeds the measurement of the optimality of the immediately preceding modification of the trial route by at least the improvement threshold.

24. A method according to claim 23 further comprising:
    continuing the addition of at least one more node from the initial route to the trial route and the subsequent optimization and measurement of the optimality of the further modified trial route following a determination that the measurement of the optimality of the immediately preceding modification of the trial route failed to improve the measure of optimality by at least the improvement threshold;
    determining if the measure of optimality of the further modified trial route improved by at least the improvement threshold over the measure of optimality of the immediately preceding modification;
    deleting the node that was most recently added if the addition of the additional node fails to improve the measure of optimality by at least the improvement threshold; and
    repeating said continuing and determining steps if the addition of the additional node improves the measure of optimality by at least the improvement threshold.

25. A method according to claim 22 further comprising:
    deleting nodes from the modified trial route upon completion of the addition of the nodes from the initial route to the trial route based upon a measure of salience of the respective nodes of the modified trial route at the completion of the addition of nodes from the initial route beginning with the node of the modified trial route having the least salience; and
    optimizing the modified trial route following the deletion of each node if the modified trial route is feasible.

26. A method according to claim 25 further comprising halting further deletion of nodes from the modified trial route upon satisfying at least one termination criterion, wherein the termination criterion is selected from group consisting of a determination that the modified trial route is infeasible and a determination that a measure of optimality of the modified trial route decreased by more than a predefined degradation threshold.

27. A method according to claim 26 further comprising adding the node that was most recently deleted from the modified trial route following halting of further deletion of nodes from the modified trial route such that the resulting modified trial route is again feasible.

28. A method according to claim 25 further comprising:
    continuing the deletion of at least one additional node from the modified trial route following satisfaction of at least one termination criterion selected from the group consisting of a determination that the modified trial route is infeasible and a determination that a measure of optimality of the modified trial route decreased by more than the predefined degradation threshold;
    determining if the further modified trial route continues to satisfy the termination criterion;
    adding the node that was most recently deleted if the deletion of the additional node continues to satisfy the termination criterion; and
    repeating said continuing and determining steps if the deletion of the additional node causes the further modified trial route to be feasible and to have a measure of optimality that decreases by no more than the predefined degradation threshold relative to the measure of optimality of the immediately preceding trial route.

29. A method of designing a route for a transport element comprising:
establishing at least one constraint that limits possible routes for the transport element, wherein establishing the at least one constraint comprises establishing at least one hard point constraint defining a location of a hard point through which the transport element must pass;
establishing a minimum bend angle for the transport element;
establishing a minimum straight segment length for each segment of the transport element;
establishing a selection criterion for evaluating the possible routes for the transport element, wherein each route for the transport element is defined by a plurality of parameters, wherein establishing the selection criterion comprises:
defining a preferred value for each parameter and a violation cost function defining a cost for variances from the preferred value; and
defining the selection criterion to be based upon a weighted combination of the cost for variances from the preferred value for each parameter;
automatically defining the route for the transport element in accordance with the at least one constraint including the at least one hard point, the minimum straight segment length and the minimum bend angle and further in accordance with the selection criterion, wherein automatically defining the route comprises automatically selecting at least one node of the route; and
providing the route for the transport element to a user.

30. A method of designing a route for an additional transport element at least partially based upon the route of an actual transport element, the method comprising:
defining a space through which the route of the additional transport element will extend based at least in part upon the route of the actual transport element, wherein the defined space is sized such that a plurality of candidate routes for the additional transport element extend therethrough;
selecting the route of the additional transport element from among the plurality of candidate routes that each extend through the defined space such that the routes of both the actual transport element and the additional transport element coexist without interference therebetween; and
providing the route of the additional transport element to a user.

31. A method according to claim 30 wherein defining the space comprises defining a sleeve surrounding the actual transport element through which the route of the additional transport element will extend.

32. A method according to claim 31 wherein defining the sleeve comprises defining an annular sleeve having an opening through which the actual transport element extends.

33. A method according to claim 30 further comprising establishing a selection criterion for evaluating the candidate routes for the transport element, and wherein selecting the route for the transport element comprises selecting the route for the transport element pursuant to the selection criterion.

34. A method of designing a route for a transport element comprising:
establishing a selection criterion for evaluating possible routes for the transport element based upon at least one design characteristic of the route;
individually weighting contributions to the selection criterion attributable to respective design characteristics;
defining the route for the transport element in accordance with the weighted selection criterion;
adjusting the respective weight of the contribution to the selection criterion of at least one design characteristic;
redefining the route for the transport element in accordance with the reweighted selection criterion; and
providing the route for the transport element to a user,
wherein at least one of said defining and redefining steps comprises defining the route for the transport element to include segments that are non-orthogonal relative to one another.

35. A method according to claim 34 further comprising repeating the adjustment of the respective weight of the contribution of at least one design characteristic and the redefinition of the route for the transport element.

36. A method according to claim 34 wherein individually weighting the respective weight of the contribution of at least one design characteristic comprises individually weighting the contributions of the design characteristics selected from the group consisting of path constraints based upon background structure, path constraints selected by a designer and intrinsic constraints dependent upon the transport element itself and independent of the background structure.

37. A computer program product for designing a route for a transport element, the computer program product comprising a computer-readable storage medium having computer-readable instructions embodied therein, the computer-readable instructions comprising:
first computer-readable instructions capable of establishing at least one constraint that limits possible routes for the transport element, wherein said first computer-readable instructions are further capable of establishing at least one inequality constraint which limits the possible routes for the transport element without fixing a position of any portion of the transport element, and wherein said first computer-readable instructions are also capable of establishing at least one hard point constraint defining a location of a hard point through which the transport element must pass;
second computer-readable instructions capable of establishing a selection criterion for evaluating the possible routes for the transport element, wherein each route for the transport element is defined by a plurality of parameters, wherein the second computer-readable instructions include instructions for:
defining a preferred value for each parameter and a violation cost function defining a cost for variances from the preferred value; and
defining the selection criterion to be based upon a weighted combination of the cost for variances from the preferred value for each parameter;
third computer-readable instructions capable of automatically defining the route for the transport element in accordance with the at least one constraint and pursuant to the selection criterion, wherein said third computer-readable instructions are also capable of defining the route for the transport element to include straight segments that are non-orthogonal relative to one another; and
fourth computer-readable instructions configured to output the route for the transport element.

38. A computer program product according to claim 37 wherein said third computer-readable instructions are further capable of automatically defining a plurality of nodes along the route.

39. A computer program product according to claim 37 wherein said first computer-readable instructions are further capable of establishing at least one adjustable hard point constraint defining a region within which a hard point is located and through which the transport element must pass.

40. A computer program product according to claim 37 wherein said first computer-readable instructions are further capable of establishing a first plane containing at least a portion of a model transport element in which the route must remain and establishing second planes extending parallel to respective segments of the model transport element and perpendicular to the first plane which limit the proximity of the route to the respective segments of the model transport element, and wherein said second computer-readable instructions means are further capable of establishing a spacing of each segment of the transport element from the second plane associated with the respective segment of the model transport element to be a selection criterion.

41. A computer program product according to claim 37 wherein said third computer-readable instructions are further capable of simultaneously defining respective routes for a plurality of transport elements.

42. An apparatus for designing a route for a transport element, the apparatus comprising a processing element capable of establishing at least one constraint including at least one inequality constraint which limits the possible routes for the transport element without fixing the position of any portion of the transport element, said processing element capable of establishing the at least one constraint to include at least one hard point constraint defining a location of a hard point through which the transport element must pass, said processing element also capable of establishing a selection criterion for evaluating the possible routes for the transport element, wherein each route for the transport element is defined by a plurality of parameters, and wherein said processing element is configured to establish the selection criterion by defining a preferred value for each parameter and a violation cost function defining a cost for variances from the preferred value and by defining the selection criterion to be based upon a weighted combination of the cost for variances from the preferred value for each parameter, and said processing element further capable of automatically defining the route for the transport element in accordance with the at least one constraint and pursuant to the selection criterion, said processing element capable of automatically defining the route so as to include straight segments that are non-orthogonal relative to one another, said processing element also configured to output the route for the transport element to a user.

43. An apparatus according to claim 42 wherein said processing element is further capable of automatically defining a plurality of nodes along the route.

44. An apparatus according to claim 42 wherein said processing element is further capable of establishing the at least one constraint to include at least one adjustable hard point constraint defining a region within which a hard point is located and through which the transport element must pass.

45. An apparatus according to claim 42 wherein said processing element is further capable of establishing the at least one constraint to include both a first plane containing at least a portion of a model transport element in which the route must remain and second planes extending parallel to respective segments of the model transport element and perpendicular to the first plane which limit the proximity of the route to the respective segments of the model transport element, and wherein said processing element further capable of establishing the selection criterion to include spacing of each segment of the transport element from the second plane associated with the respective segment of the model transport element to be a selection criterion.

46. An apparatus according to claim 42 wherein said processing element is further capable of simultaneously defining respective routes for a plurality of transport elements.

47. A method of designing a route for a tube throughout an air vehicle comprising:
    establishing at least one constraint that limits possible routes for the tube, wherein establishing the at least one constraint comprises establishing at least one inequality constraint which limits the possible routes for the tube without fixing a position of any portion of the tube, wherein establishing the at least one constraint further comprises establishing at least one hard point constraint defining a location of a hard point through which the tube must pass;
    establishing a selection criterion for evaluating the possible routes for the tube, wherein each route for the tube is defined by a plurality of parameters, wherein establishing the selection criterion comprises:
        defining a preferred value for each parameter and a violation cost function defining a cost for variances from the preferred value; and
        defining the selection criterion to be based upon a weighted combination of the cost for variances from the preferred value for each parameter;
    automatically defining the route for the tube in accordance with the at least one constraint and pursuant to the selection criterion, wherein automatically defining the route comprises defining the route for the tube to include straight segments that are non-orthogonal relative to one another; and
    providing the route for the tube to a user.

48. A method according to claim 47 wherein establishing the at least one constraint further comprises establishing at least one path constraint selected from the group consisting of a fitting location, a clamp location, an offset, a standoff, a through loop, a stay-away point, a stay-away plane, a stay-out zone and a stay-in plane.

49. A method according to claim 47 wherein establishing the at least one constraint further comprises establishing at least one intrinsic constraint dependent upon the transport element itself and selected from the group consisting of a minimum bend angle, a maximum bend angle, a minimum straight section length between bends and a constant bend radius.

50. A method according to claim 47 wherein establishing at least one path constraint comprises establishing a first plane containing at least a portion of a model transport element in which the route must remain and establishing second planes extending parallel to respective segments of the model transport element and perpendicular to the first plane which limit the proximity of the route to the respective segments of the model transport element, and wherein establishing the selection criterion comprises establishing a spacing of each segment of the transport element from the second plane associated with the respective segment of the model transport element to be a selection criterion.

* * * * *